United States Patent
Morris et al.

(10) Patent No.: US 6,425,026 B1
(45) Date of Patent: Jul. 23, 2002

(54) DISTRIBUTION, PROCESSING, AND RECONSTRUCTION OF VARIABLE-SIZED IMAGES USING MULTIPLE PROCESSOR ARRAYS

(75) Inventors: Carl Morris; Kevin Dennis, both of Orlando; Howard Del Fava, Chuluota, all of FL (US)

(73) Assignee: TeraNex, Inc., Orlando, FL (US)

( * ) Notice: Subject to any disclaimer, the term of this patent is extended or adjusted under 35 U.S.C. 154(b) by 0 days.

(21) Appl. No.: 09/511,697

(22) Filed: Feb. 23, 2000

(51) Int. Cl.$^7$ .............................................. G06F 13/00
(52) U.S. Cl. ......................................... 710/100; 712/11
(58) Field of Search ............................. 710/100; 712/4, 712/11, 22

(56) References Cited

U.S. PATENT DOCUMENTS

| | | | | |
|---|---|---|---|---|
| 4,870,704 A | * | 9/1989 | Matelan | 710/120 |
| 5,093,920 A | | 3/1992 | Agrawal et al. | 712/29 |
| 5,128,658 A | | 7/1992 | Pappas et al. | 345/431 |
| 5,388,220 A | | 2/1995 | Okabayashi | 711/154 |
| 5,526,490 A | | 6/1996 | Nishikawa | 709/225 |
| 5,761,697 A | * | 6/1998 | Curry | 711/100 |
| 5,812,202 A | | 9/1998 | Ng et al. | 348/446 |
| 5,822,608 A | * | 10/1998 | Dieffenderfer | 712/20 |
| 6,073,185 A | | 6/2000 | Meeker | 710/1 |
| 6,173,388 B1 | | 1/2001 | Abercrombie et al. | 712/22 |

* cited by examiner

Primary Examiner—Eric Coleman
(74) Attorney, Agent, or Firm—Burns, Doane, Swecker & Mathis, LLP

(57) ABSTRACT

Selectively distributing a plurality of data items to a plurality of hardware destinations that share a common bus involves, for each one of the data items, determining which of the hardware destinations the data item should be distributed to, wherein at least one of the data items should be distributed to two or more hardware destinations. The data item is then supplied to the common bus and, for each of the hardware destinations to which the data item should be distributed, a corresponding hardware destination signal is generated that causes the data item to be received in the hardware destination from the common bus, wherein for each data item, the corresponding hardware destination signals are generated substantially simultaneously. This may be applied in a number of scenarios, including the distribution of data items to a plurality of processor boards, and to the distribution of data items to a plurality of channels within a single processor board. A similar approach is provided for forming a sequence of data items by selectively collecting a plurality of data items from a plurality of processor boards in a multiprocessor system.

12 Claims, 21 Drawing Sheets

| FRAME BUFFER 1 | FRAME BUFFER 2 | FRAME BUFFER 3 | FRAME BUFFER 4 | FRAME BUFFER 5 | |
|---|---|---|---|---|---|
| COL 0..31 | COL 32..63 | COL 64..95 | COL 96..127 | COL 128..159 | ROW 0, SUBFRAME 0 |
| COL 140..171 | COL 172..203 | COL 204..235 | COL 236..267 | COL 268..299 | ROW 0, SUBFRAME 1 |
| COL 256..287 | COL 288..319 | COL 320..351 | COL 352..383 | COL 384..415 | ROW 0, SUBFRAME 2 |
| COL 0..31 | COL 32..63 | COL 64..95 | COL 96..127 | COL 128..159 | ROW 1, SUBFRAME 0 |
| COL 140..171 | COL 172..203 | COL 204..235 | COL 236..267 | COL 268..299 | ROW 1, SUBFRAME 1 |
| COL 256..287 | COL 288..319 | COL 320..351 | COL 352..383 | COL 384..415 | ROW 1, SUBFRAME 2 |
| ⋮ | ⋮ | ⋮ | ⋮ | ⋮ | |
| COL 0..31 | COL 32..63 | COL 64..95 | COL 96..127 | COL 128..159 | ROW 299, SUBFRAME 0 |
| COL 140..171 | COL 172..203 | COL 204..235 | COL 236..267 | COL 268..299 | ROW 299, SUBFRAME 1 |
| COL 256..287 | COL 288..319 | COL 320..351 | COL 352..383 | COL 384..415 | ROW 299, SUBFRAME 2 |

DISTRIBUTION, PROCESSING, AND RECONSTRUCTION OF VARIABLE-SIZED IMAGES USING MULTIPLE PROCESSOR ARRAYS

BACKGROUND

The present invention relates to parallel computing, more particularly to mesh connected computing, and even more particularly to the distribution, processing and reconstruction of images by means of a mesh connected computer having fewer processing elements than the size of the image.

In a number of technological fields, such as digital signal processing of video image data, it is necessary to perform substantially identical logical or arithmetic operations on large amounts of data in a short period of time. Parallel processing has proven to be an advantageous way of quickly performing the necessary computations. In parallel processing, an array of processor elements, or cells, is configured so that each cell performs logical or arithmetic operations on its own data at the same time that all other cells are processing their own data. Machines in which the logical or arithmetic operation being performed at any instant in time is identical for all cells in the array are referred to by several names, including Single Instruction-Multiple Data (SIMD) machines.

A common arrangement for such a machine is as a rectangular array of cells, with each interior cell being connected to its four nearest neighboring cells (designated north, south, east and west) and each edge cell being connected to a data input/output device. In this way, a mesh of processing elements is formed. Accordingly, the term "Mesh Connected Computer" (MCC) is often applied to this architecture.

In a MCC, each cell is connected as well to a master controller which coordinates operations on data throughout the array by providing appropriate instructions to the processing elements. Such an array proves useful, for example, in high resolution image processing. The image pixels comprise a data matrix which can be loaded into the array for quick and efficient processing.

Although SIMD machines may all be based upon the same generic concept of an array of cells all performing the same function in unison, parallel processors vary in details of cell design. For example, U.S. Pat. No. 4,215,401 to Holsztynski et al. discloses a cell which includes a random access memory (RAM), a single bit accumulator, and a simple logical gate. The disclosed cell is extremely simple and, hence, inexpensive and easily fabricated. A negative consequence of this simplicity, however, is that some computational algorithms are quite cumbersome so that it may require many instructions to perform a simple and often repeated task.

U.S. Pat. No. 4,739,474 to Holsztynski et al., represents a higher level of complexity, in which the logic gate is replaced by a full adder capable of performing both arithmetic and logical functions. This increase in the complexity of the cell's computational logic allows fewer cells to provide higher performance.

U.S. patent application Ser. No. 08/112,540, which was filed on Aug. 27, 1993 now U.S. Pat. No. 6,073,185, in the name of Meeker, and U.S. patent application Ser. No. 09/057,482, which was filed on Apr. 9, 1998 now U.S. Pat. No. 6,173,388, in the name of Andrew P. Abercrombie et al. each describe still further improvements in SIMD architecture computers.

As mentioned above, MCCs prove especially useful in applications such as high resolution image processing. Various types of sensors are capable of producing large quantities of data signals (henceforth referred to simply as "data") that, when taken together, constitute an "image" of the sensed object or terrain. The term "image" is used broadly throughout this specification to refer not only to pictures produced by visible light, but also to any collection of data, from any type of sensor, that can be considered together to convey information about an object that has been sensed. In many applications, the object or terrain is sensed repeatedly, often at high speed, thereby creating many images constituting a voluminous amount of data. Very often, the image data needs to be processed in some way, in order to be useful for a particular application. While it is possible to perform this processing "off-line" (i.e., at a time after all of the data has been collected), the application that mandates the collection of image data may further require that the images be processed in "real-time", that is, that the processing of the image data keep up with the rate at which it is collected from the sensor. Further complicating the image processing task is the fact that some applications require the sensing and real-time processing of images that are simultaneously collected from two or more sensors.

Examples of the need for high-speed image processing capability can be found in both military and civil applications. For example, future military weapon platforms will use diverse suites of high-data-rate infrared, imaging laser, television, and imaging radar sensors that require real-time automatic target detection, recognition, tracking, and automatic target handoff-to-weapons capabilities. Civil applications for form processing and optical character recognition, automatic fingerprint recognition, and geographic information systems are also being pursued by the government. Perhaps the greatest future use of real-time image processing will be in commercial applications like medical image enhancement and analysis, automated industrial inspection and assembly, video data compression, expansion, editing and processing, optical character reading, automated document processing, and many others.

Consequently, the need for real-time image processing is becoming a commonplace requirement in commercial and civil government markets as well in the traditional high-performance military applications. The challenge is to develop an affordable processor that can handle the tera-operations-per-second processing requirement needed for complex image processing algorithms and the very high data rates typical of video imagery.

One solution that has been applied to image processing applications with some success has been the use of high-performance digital signal processors (DSP), such as the Intel i860 or the Texas Instruments (TI) TMS320C40, which have architectures inspired by high-performance military vector processing algorithms, such as linear filters and the fast Fourier transform. However, traditional DSP architectural characteristics, such as floating point precision and concurrent multiply-accumulate (vector) hardware components, are less appropriate for image processing applications since they process with full precision whether it is needed or not.

New hardware architectures created specifically for image processing applications are beginning to emerge from the military aerospace community to satisfy the demanding requirements of civil and commercial image processing applications. Beyond the high input data rates and complex algorithms, the most unique characteristics of image processing applications are the two-dimensional image structures and the relatively low precision required to represent and process video data. Sensor input data precision is usually only 8 to 12 bits per pixel. Shape analysis edge operations can be accomplished with a single bit of computational precision. While it is possible that some other operations may require more than 12 bits, the average precision required is often 8 bits or less. These characteristics can be exploited to create hardware architectures that are very efficient for image processing.

Both hard-wired (i.e., algorithm designed-in hardware) and programmable image processing architectures have been tried. Because of the immaturity of image processing-algorithms, programmable image processing architectures (which, by definition, are more flexible than hard-wired approaches) are the most practical. These architectures include Single Instruction Single Data (SISD) uniprocessors, Multiple Data Multiple Instruction (MIMD) vector processors, and Single Instruction Multiple Data (SIMD) two-dimensional array processors.

Massively parallel SIMD operating architectures, having two-dimensional arrays of processing elements (PE), each operating on a small number of pixels, have rapidly matured over the last 10 years to become the most efficient architecture for high-performance image processing applications. These architectures exploit image processing's unique algorithm and data structure characteristics, and are therefore capable of providing the necessary teraoperation-per-second support to image processing algorithms at the lowest possible hardware cost.

Where required by the algorithm suite, the SIMD bit serial PE is flexible enough to perform 1 bit or full precision floating point operations. In most cases, the highest possible implementation efficiencies are often achieved because excess hardware in the SIMD architecture is seldom idle, in contrast to those solutions which employ DSP hardware for image processing. Two-dimensional SIMD image processing architectures also mirror the two-dimensional image data structures to achieve maximum interprocessor communication efficiency. These processors typically use direct nearest neighbor (i.e, north, south, east, and west) PE connections to form fine-grained, pixel-to-processor mapping between the computer architecture and the image data structure. The two-dimensional grid of interconnections provides two-dimensional SIMD architectures with inherent scalability. As the processing array is increased in size, the data bandwidth of the inter-PE bus (i.e, two-dimensional processor interconnect) increases naturally and linearly.

The fastest image processing time could be achieved by configuring the size of a PE array to exactly match the expected size of the largest image to be processed. In such a configuration, one would need only to load the entire image into the array, control the PE array to perform the image processing algorithm, and then read out the results. However, in order for a parallel processing system to be commercially feasible, the quantity of parallel processing elements in a system must be significantly smaller than the number of pixels in the incoming image. When this is the case, the incoming image must be broken down into smaller sub-images which are then separately processed and then reconstructed for output. For flexibility, the system should also support variable-sized input and output images, preferably by simply reprogramming the sub-image distribution scheme.

For example, consider the case in which an N×M PE array is embodied on a single integrated circuit (IC), with each of the interior PE's connected to its four nearest neighbors (NORTH, EAST, SOUTH, and WEST). A larger array, for example an 5N×5M array, can be constructed by configuring an array of these ICs (e.g., a 5×5 array of these ICs) on a circuit board (henceforth referred to simply as "board"). Still greater processing power can be arranged by designing a system that includes multiple boards.

Within any given IC, each of the PEs is coupled to its nearest neighbors, and is therefore capable of exchanging data with one or more of those neighbors as directed by the master controller. Similarly, the PEs arranged on any one board are often interconnected to enable the PEs along the perimeter of one IC's PE array to exchange data with a neighboring PE located along the perimeter of a neighboring IC's PE array. Usually, however, it is impractical to design a system that provides the ability for any PE located on one board to exchange data with any PE located on a different board within the same system.

The ability, or lack thereof, of a PE to exchange data with a neighboring PE has ramifications on how an image can best be processed by the array because many of these algorithms require that, in order to process any given pixel, information about one or more of that pixel's neighboring pixels be available. For example, consider the exemplary image frame 100 depicted in FIG. 1. The image frame 100 comprises a 3M×2N array of pixels. Assume that a system for processing the image comprises six boards, each having an M×N array of PEs arranged thereon. One might then divide up the image frame 100 into six frame segments 101, 103, 105, 107, 109, 111, each consisting of a unique M×N section of the image frame 100. Each of the frame segments 101, 103, 105, 107, 109, 111 can then be supplied to a respective one of the six boards for processing. When processing is complete, the processed sections can then be collected from the individual boards and reconstructed to form a complete processed image frame.

Less than desirable results are likely to result from the above-described processing strategy. First, if the system is designed in such a way that the PEs on one board are not capable of exchanging data with the PEs located on other boards, then the processing of pixels located along the borders between adjacent frame segments will suffer from "edge effects" due to interaction with "off-array" pixels instead of the actual neighboring pixels. For example, if the rows of the image frame 100 are numbered from 1 to 2N, starting from the top, and if the columns of the image frame 100 are numbered from 1 to 3M, starting from the left, then the processing of the pixel located at row 1, column M (denoted "p(M, 1)") should take into account the value of the neighboring pixel located at row 1, column (M+1) (denoted "p(M+1,1)"). However, because these pixels have been distributed to different boards, the processing algorithm applied to each of these pixels will use an erroneous pixel value in place of the actual horizontally neighboring pixel value. Similar edge effects will result at the borders between frame segments 101, 103, 105, 107, 109, 111 in the vertical direction as well.

Furthermore, the edge effect problem can occur in connection with pixels that are located entirely within the PE array of a single board if the size of the frame segment 101, 103, 105, 107, 109, 111 is larger than the size of a single board's PE array, thereby requiring that the frame segment 101, 103, 105, 107, 109, 111 be further subdivided into "subframes" that are sequentially processed by the PE array on the board. For example, suppose that an M×N frame segment 101 is to be processed by a board having only an M/2×N/2 PE array. This can be accomplished by subdividing the M×N. frame segment 101 into four distinct subframes, each sized at M/2×N/2. Because the PE array will have to process each of these in sequence, the PEs that process pixels located along an edge of one subframe will not be able to utilize information about the value of a horizontally or vertically neighboring pixel located along an edge of a neighboring subframe. This will result in edge effect problems.

To avoid these edge effect problems, image frames can be divided into overlapping frame segments, whereby some pixels may be assigned to two or more frame segments. For example, consider the image frame 200 shown in FIG. 2. The exemplary image frame 200 consists of a 720×480 array of pixels. In order to permit the image frame 200 to be processed in a system having six boards, each board having its own PE array that does not exchange data with any other PE array, the image frame 200 can be divided into six frame segments (FSs) 207, each dimensioned as a 300×300 pixel array. As can be seen in FIG. 2, dimensioning the frame segments 207 in this manner means that there are areas of overlap between adjacent frame segments 207. In this example, we have the following situation:

- the pixels located in the rightmost 90 columns of the frame segment 207 assigned to board 1 also make up the leftmost 90 columns of the frame segment 207 assigned to board 2;
- the pixels located in the rightmost 90 columns of the frame segment 207 assigned to board 2 also make up the leftmost 90 columns of the frame segment 207 assigned to board 3;
- the pixels located in the rightmost 90 columns of the frame segment 207 assigned to board 4 also make up the leftmost 90 columns of the frame segment 207 assigned to board 5;
- the pixels located in the rightmost 90 columns of the frame segment 207 assigned to board 5 also make up the leftmost 90 columns of the frame segment 207 assigned to board 6;
- the pixels located in the bottommost 120 columns of the frame segment 207 assigned to board 1 also make up the topmost 120 columns of the frame segment 207 assigned to board 4;
- the pixels located in the bottommost 120 columns of the frame segment 207 assigned to board 2 also make up the topmost 120 columns of the frame segment 207 assigned to board 5; and
- the pixels located in the bottommost 120 columns of the frame segment 207 assigned to board 3 also make up the topmost 120 columns of the frame segment 207 assigned to board 6.

Because there are varying degrees of both horizontal and vertical overlap, pixels may be assigned to one, two or four boards, depending on their location within the frame image 200. For example, some pixels, such as those located in region 201, are assigned to four boards. Pixels located on other border regions, such as region 203 and region 205, are assigned to only two boards. Pixels not located in any overlap region are assigned to just one board. This strategy provides a mechanism for eliminating edge effects, as will be illustrated by the following example. When board 1 processes its frame segment 207, edge effects will be produced for pixels lying in region 205, because the PEs on board 1 will not have access to the pixel values lying to the right of region 205. However, those pixels lying in region 203 do not suffer from this problem because the PEs on board 1 do have access to the pixel values lying to the right in region 205.

Similarly, when board 2 processes its frame segment 207, edge effects will be produced for pixels lying in region 203, because the PEs on board 1 will not have access to the pixel values lying to the left of region 203. However, those pixels lying in region 205 do not suffer from this problem because the PEs on board 2 do have access to the pixel values lying to the left in region 203.

After all of the boards have finished their processing, a complete processed image frame without edge effects is reconstructed by using board 1's results for those pixels lying in region 203, and board 2's results for those pixels lying in region 205.

A similar strategy is adopted for processing all other overlapping regions in image frame 200, both horizontal and vertical. The dotted lines in FIG. 2 illustrate from which board the processed results are taken to reconstruct a complete processed image.

This overlapping strategy can similarly be used within a single board, when the frame segment 207 needs to be further divided into subframes that will be sequentially processed by the PE array on that board.

It is possible to design and construct dedicated hardware that will perform the necessary input/output (I/O) to move pixels into and out of PE array boards when the size of the image frame, number of boards, and size of the PE array on a board is fixed. However, to make for a more commercially viable, flexible image processing architecture, capable of processing variable sized image frames and further capable of adapting to system configurations having a variable number of boards, it is desirable to provide techniques and apparatuses that simplify the process of inputting frame segments 207 into a plurality of boards, distributing possibly overlapping subframes to PE arrays on a given board, and reconstruct a processed image frame from the processed frame segments generated by the boards.

SUMMARY

In accordance with one aspect of the present invention, the foregoing and other objects are achieved in methods and apparatuses for selectively distributing a plurality of data items to a plurality of hardware destinations that share a common bus. This involves, for each one of the data items, utilizing a distribution technique that includes determining which of the hardware destinations the data item should be distributed to, wherein at least one of the data items should be distributed to two or more hardware destinations. The data item is then supplied to the common bus; and for each of the hardware destinations to which the data item should be distributed, a corresponding hardware destination signal is generated that causes the data item to be received in the hardware destination from the common bus, wherein for each data item, the corresponding hardware destination signals are generated substantially simultaneously. In this manner, each data item to be distributed need be placed on the common bus only once, even if it is to be distributed to more than one hardware destination.

In another aspect of the invention, each of the hardware destinations may be a processor board in a multiprocessor system.

In yet another aspect of the invention, the hardware destination signal may be generated from one or more control words that are retrieved from respective one or more control memories.

In still another aspect of the invention, each bit in the one or more control words may uniquely correspond to one of the processor boards.

In yet another aspect of the invention, the hardware destination signal may be generated by logically ANDing two or more control words. For example, one control word may be associated with rows of processor boards, and another control word may be associated with columns of processor boards. If a same bit position in both the row and column control words has an asserted bit (e.g., a binary "1"), then that processor board will be one of the hardware destinations for the data item.

In alternative embodiments of the invention, each of the hardware destinations may be one of a plurality of input memory devices that are commonly installed on a processor board.

In these embodiments as well, the hardware destination signal may be generated from a control word that is retrieved from a control memory. Furthermore, each bit in the control word may uniquely correspond to one of the input memory devices.

In another aspect of the invention, each of the input memory devices may be associated with a corresponding one of a plurality of channels on the processor board, and each of the channels may be associated with a corresponding one of a plurality of processing element arrays.

In still another aspect of the invention, the plurality of data items may form a frame segment that is partitioned into a plurality of overlapping subframes; each of the data items that should be distributed to two or more hardware destinations may be associated with an overlap region formed by at least two of the overlapping subframes; each of the input memory devices may be associated with a corresponding one of a plurality of channels on the processor board; and each of the channels may be associated with a corresponding one of a plurality of addressable storage devices. Furthermore, for each of the channels, data items are loaded into the corresponding addressable storage device from the corresponding input memory device.

In yet another aspect of the invention, the step of, for each of the channels, loading data items into the corresponding addressable storage device from the corresponding input memory device, may be performed such that, for each of the channels, each data item that is associated with an overlap region associated with vertically overlapping subframes is stored at only one location within the corresponding one of the plurality of addressable storage devices.

In still another aspect of the invention, each of the channels is associated with a corresponding one of a plurality of processing element arrays. Furthermore, for each of the channels, data items are loaded into the corresponding one of the processing element arrays from the corresponding addressable storage device. In each of the processing element arrays, a processed subframe is then formed, and the processed subframe is aligned so that at least one edge row of processing elements in the processing element array includes a selected row of processed data items, wherein the selected row of processed data items includes at least one processed data item that will be supplied as an output data item from the processor board.

In yet another aspect of the invention, in each of the processing element arrays, a processed subframe may be formed in which each processed data item is marked to indicate whether it is to be retained or discarded.

In still another aspect of the invention, for each of the channels, the processed subframe may be loaded from the corresponding processing element array into the corresponding addressable storage device.

In yet another aspect of the invention, each of the channels may be associated with a corresponding one of a plurality of output storage devices. Furthermore, for each of the channels, a data item is conditionally loaded from the corresponding addressable storage device into the corresponding output storage device only if the data item is marked for retention.

In still another aspect of the invention, the plurality of data items forms an image frame that is partitioned into a plurality of overlapping frame segments; and each of the data items that should be distributed to two or more hardware destinations is associated with an overlap region formed by at least two of the overlapping frame segments.

In yet another aspect of the invention, the plurality of data items may form a frame segment that is partitioned into a plurality of overlapping subframes; and each of the data items that should be distributed to two or more hardware destinations is associated with an overlap region formed by at least two of the overlapping subframes.

The invention further involves methods and apparatuses for forming a sequence of data items by selectively collecting a plurality of data items from a plurality of processor boards in a multiprocessor system, wherein the processor boards share a common bus. This is done by, for each one of the data items in the sequence to be formed, performing a collection procedure that includes retrieving a board selection word from each of one or more control memories; generating a processor board selection signal from the retrieved one or more board selection words; using the processor board selection signal to selectively cause one of the processor boards to supply the data item to the common bus; and collecting the data item from the common bus, whereby the plurality of data items are collected from the plurality of processor boards in an order that is determined by an order in which the board selection words are retrieved from the one or more control memories.

In another aspect of the invention, each bit in the one or more board selection words uniquely corresponds to one of the processor boards.

In still another aspect of the invention, the step of retrieving the board selection word from each of one or more control memories includes retrieving a board selection word from each of two or more control memories; and the step of generating the processor board selection signal comprises generating the processor board selection signal by logically ANDing the retrieved two or more board selection words.

In yet another aspect of the invention, each of the processor boards comprises a processor array.

In other aspects of the invention, methods and apparatuses are provided that process a subframe that comprises a plurality of data items. In accordance with one aspect, this is performed by loading the subframe into a processing element array that comprises a plurality of processing elements arranged in a rectangular array having four processing element array edges, each defined by a respective one of first and second processing element edge rows and first and second processing element edge columns. In the processing element array, a processed subframe is formed that comprises at least one non-retained edge portion and a remaining portion, wherein the non-retained edge portion alternatively comprises one or more contiguous rows, or one or more contiguous columns of processed data items that will not be retained. Then, in the processing element array, the processed subframe is aligned such that at least one of the processing element array edges stores an edge row or column of the remaining portion of the processed subframe.

In yet another aspect, the step of, in the processing element array, aligning the processed subframe includes shifting the processed subframe within the processing element array until a first processing element array edge stores the edge row or column of the remaining portion of the processed subframe. As a result, a first rectangular group of the processing elements is formed that has an edge that is opposite the first processing element array edge, and that stores data items that will not be retained, wherein the data items stored in the first rectangular group of the processing elements constitute a first rectangular group of non-retained data items.

In still another aspect, the shifted processed subframe is then moved from the processing element array to an addressable memory device, wherein the edge row or column of the remaining portion of the processed subframe overwrites a second rectangular group of non-retained data items that was previously moved from the processing element array to the addressable memory device. This is useful for assembling a larger processed image in the addressable memory device.

In other aspects, subframe processing is performed by loading the subframe into a processing element array, and forming a processed subframe in which each processed data item is marked to indicate whether the processed data item is to be retained or discarded.

In yet another aspect of the invention, one of the processed data items is then conditionally loaded into an output storage device only if the processed data item is marked for retention.

In still another aspect of the invention, the processed subframe is first loaded from the processing element array into an addressable memory. In these embodiments, one of the processed data items may be conditionally loaded from the addressable memory into the output storage device only if the processed data item is marked for retention.

BRIEF DESCRIPTION OF THE DRAWINGS

The objects and advantages of the invention will be understood by reading the following detailed description in conjunction with the drawings in which:

FIG. 15 illustrates an arrangement of horizontally sub-framed data in the frame buffer in accordance with an aspect of the invention;

DETAILED DESCRIPTION

Figure 1:
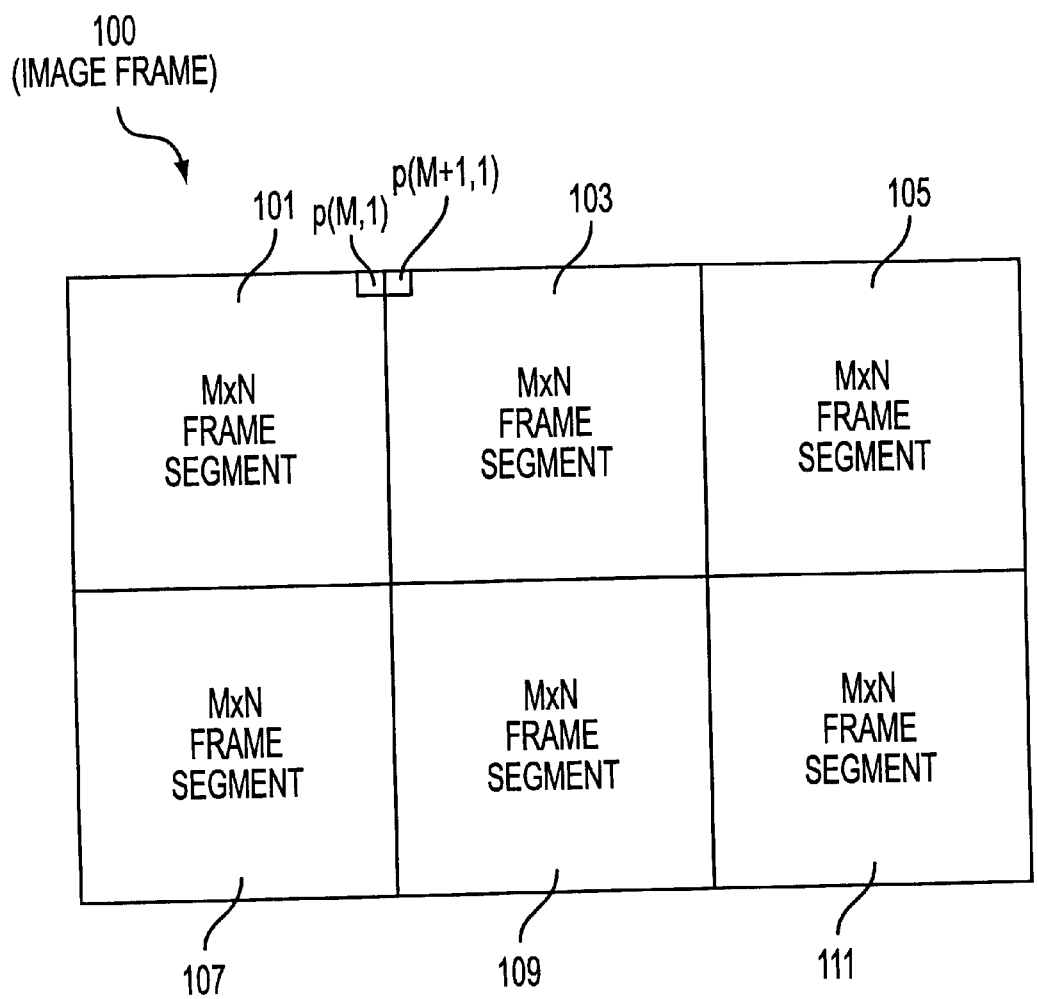
FIG. 1 depicts an exemplary image frame.

The various features of the invention will now be described with respect to the figures, in which like parts are identified with the same reference characters.

The invention relates to methods and apparatuses for distributing, processing, and reconstructing variable-sized images using multiple processor arrays. Techniques and hardware are provided for quickly and easily distributing pixels to one or more boards in accordance with their mapping in overlapping frame segments 207. The same approach may also be applied within a single board, to quickly and easily distribute pixels to one or more portions of that board's PE array in accordance with their mapping in overlapping subframes. To accomplish this, one or more control memories plus support logic are provided for controlling a pixel's distribution as soon as it is made available. The same approach may further be applied to selectively retrieve pixels from boards to reconstruct a processed image frame that is free from edge effects.

The invention will now be described with reference to an exemplary one of many possible embodiments. To facilitate an understanding of the invention, particular hardware configurations are shown. However, the practice of the invention is not limited to the exemplary embodiments presented herein. Rather, the design principles presented herein may be generally applied to many other embodiments of image processors.

Figure 3:
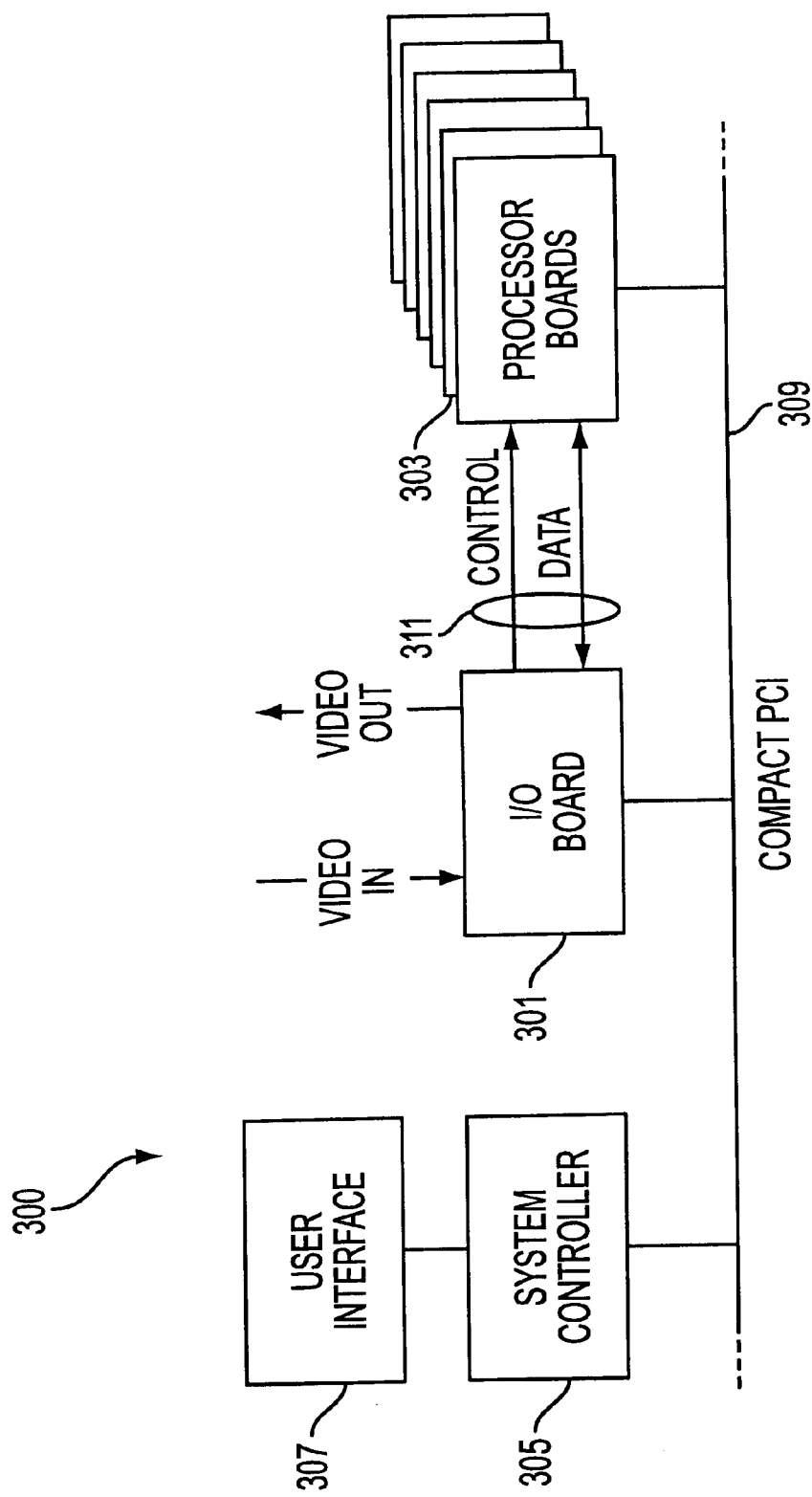
FIG. 3 is a block diagram of an exemplary image processor system in accordance with an aspect of the invention.

An exemplary image processor system 300 embodying the invention is shown in FIG. 3. For purposes of illustration, the image to be processed in this example is video data, supplied by a video sensor. However, this is not an essential feature of the invention, which is equally applicable to all types of image processors, regardless of the source of the images. The image processor system 300 includes an input/output (I/O) board 301, one or more processor boards 303, a system controller 305, and a user interface 307. The I/O board 301 and processor boards 303 are coupled to the system controller 305 by means of a bus 309, which may be, for example, a Compact PCI bus. The I/O board 301 is also coupled to the processor boards 303 by control and data lines 311. The user interface 307 permits a user to get controllable access to the system controller 305.

The image processor system 300 receives a video signal in a given video format, processes the video data, and transmits the processed video signal in the same or other video format. The I/O board 301 provides minimal buffering of the video data for the purpose of synchronizing the video transmission and reception rates to internal data rates. Input and output data flows are continuous and independent of each other. Storage of video data for processing is performed by the processor boards 303. The I/O board 301 controls data flow to and from the processor boards and provides video frame synchronization.

Figure 4:
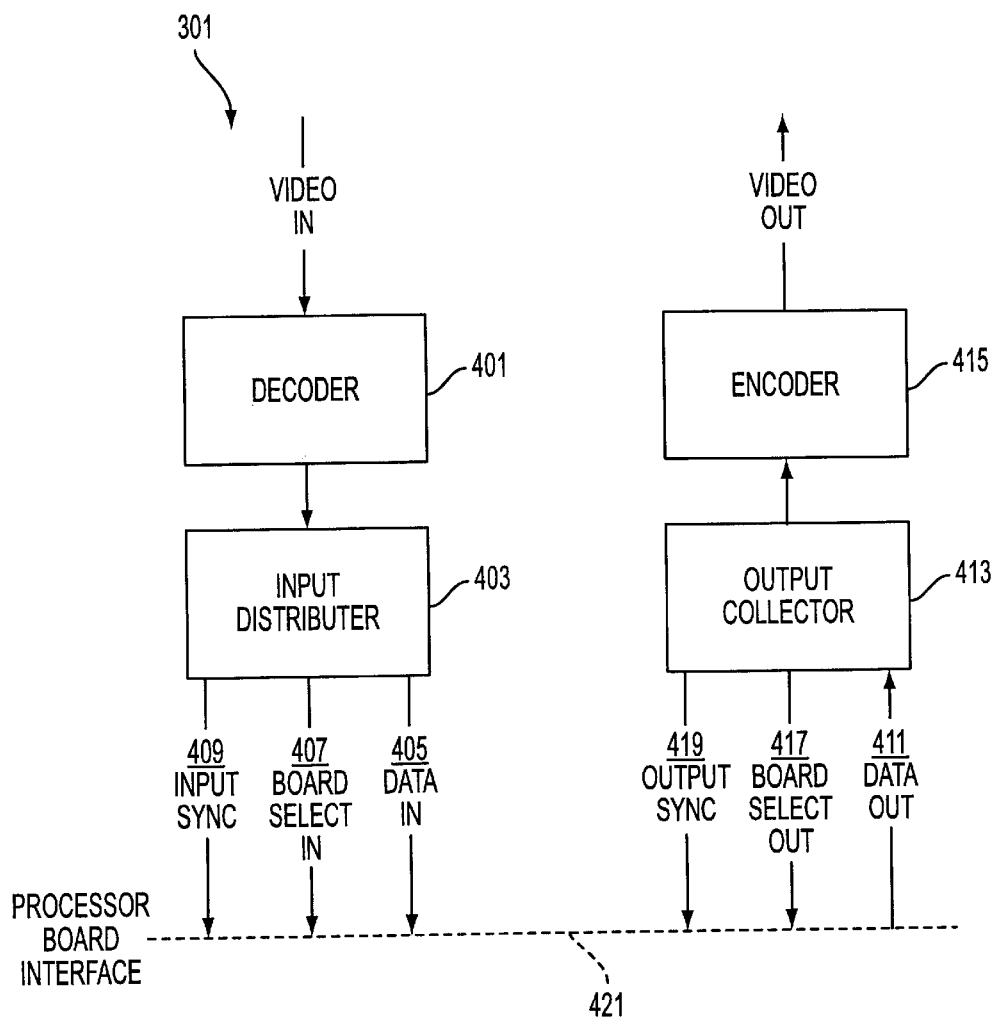
FIG. 4 is a block diagram of an exemplary embodiment of an I/O board in accordance with an aspect of the invention.

An exemplary embodiment of the I/O board 301 is shown in greater detail in FIG. 4. The I/O board 301 provides independent input and output control and data paths. The input video signal is decoded by a decoder 401, and supplied to an input distributer 403, which synchronizes the decoded video data with internal data rates and processes. The input distributer 403 then immediately sends the synchronized input data (via Data_In 405) to the processor boards 303 for processing. Each received pixel is sent to one or more processor boards as selected by the Board_Select_In signal 407. An Input_Sync signal 409 is also generated for indicating an input video frame boundary to the processor boards 303 so that they may synchronize data input with the I/O board.

After processing, the processed video data is read as needed from the processor boards 303 (via Data_Out 411). The processed video data is received from the boards under the control of an output collector 413, which synchronizes the processed video data with the video output device (not shown) and supplies it to an encoder 415 for suitable encoding prior to transmission. Each pixel is read from the appropriate processor board 303 as selected by a Board_Select_Out signal 417, which is generated by the output collector 413. An Output_Sync signal 419 is also generated by the output collector 413 for indicating an output video frame boundary to the processor boards 303 so that they may synchronize data output with the I/O board 301.

Figure 2:
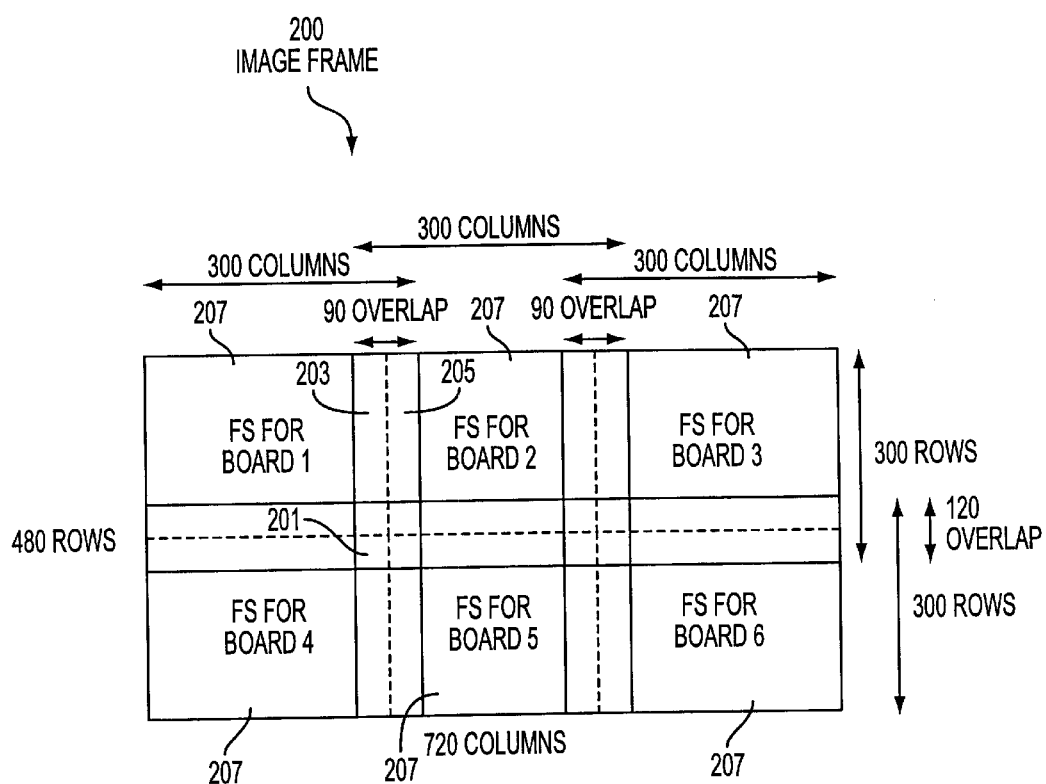
FIG. 2 depicts an exemplary image frame comprising a number of overlapping frame segments.

Each received video frame is segmented into overlapping tiles known as "frame segments" (FSs) 207 for processing by the processor boards 303 as shown and described earlier with respect to FIG. 2. As previously explained, the overlap of frame segments 207 is necessitated by the fact that the image processing algorithms employed by the processor boards 303 produces "edge effects" (pixels on the periphery of a frame segment 207 that are corrupted during processing due to interaction with "off-array" pixels). These edge effects must be eliminated whenever possible to avoid visible artifacts in the processed video image. The use of an overlap region allows the frame segment 207 boundary region which contains the edge effects to be discarded prior to reconstruction of the processed video frame. As shown in FIG. 2, the outer half of the overlap region for each processed frame segment is discarded, allowing the video frame to be reconstructed, free of edge effects, by abutting the resulting frame segments.

The distribution of the video data to processor boards 303 is performed for each pixel as it is received by the I/O board 301. In the following exemplary embodiments, pixels are received in a raster order, for example, from left to right and top to bottom of the video frame. The invention is equally applicable to other raster orders as well, including but not limited to any combination of right to left, bottom to top, and interlaced or non-interlaced. As shown in FIG. 2, each pixel is sent to one or more boards 303 depending upon its position in the image frame 200. In this example, the first 210 (=300−90) pixels of the first row are sent to board 1 only, the next 90 pixels are sent to both board 1 and board 2, the next 120 pixels are sent to board 2 only, the next 90 pixels are sent to both board 2 and board 3, and the final 210 pixels are sent to board 3 only. In the 181st (=300−120+1) row, the first 210 pixels are sent to boards 1 and 4; the next 90 pixels are sent to boards 1, 2, 4 and 5; the next 120 pixels are sent to boards 2 and 5; the next 90 pixels are sent to boards 2, 3, 5 and 6; and the final 210 pixels are sent to boards 3 and 6.

In accordance with one aspect of the invention, distribution of pixels can be configured for different input and output video frame sizes, different frame segment sizes and overlaps, and different numbers of processor boards 303. The example of FIG. 2 is provided to illustrate one of many possible processor board input (solid lines) and output (dotted lines) configurations that can easily be effected by means of the invention. An important aspect to the configurability of the invention is in the strategy adopted for controlling data distribution and collecting.

Figure 5A:
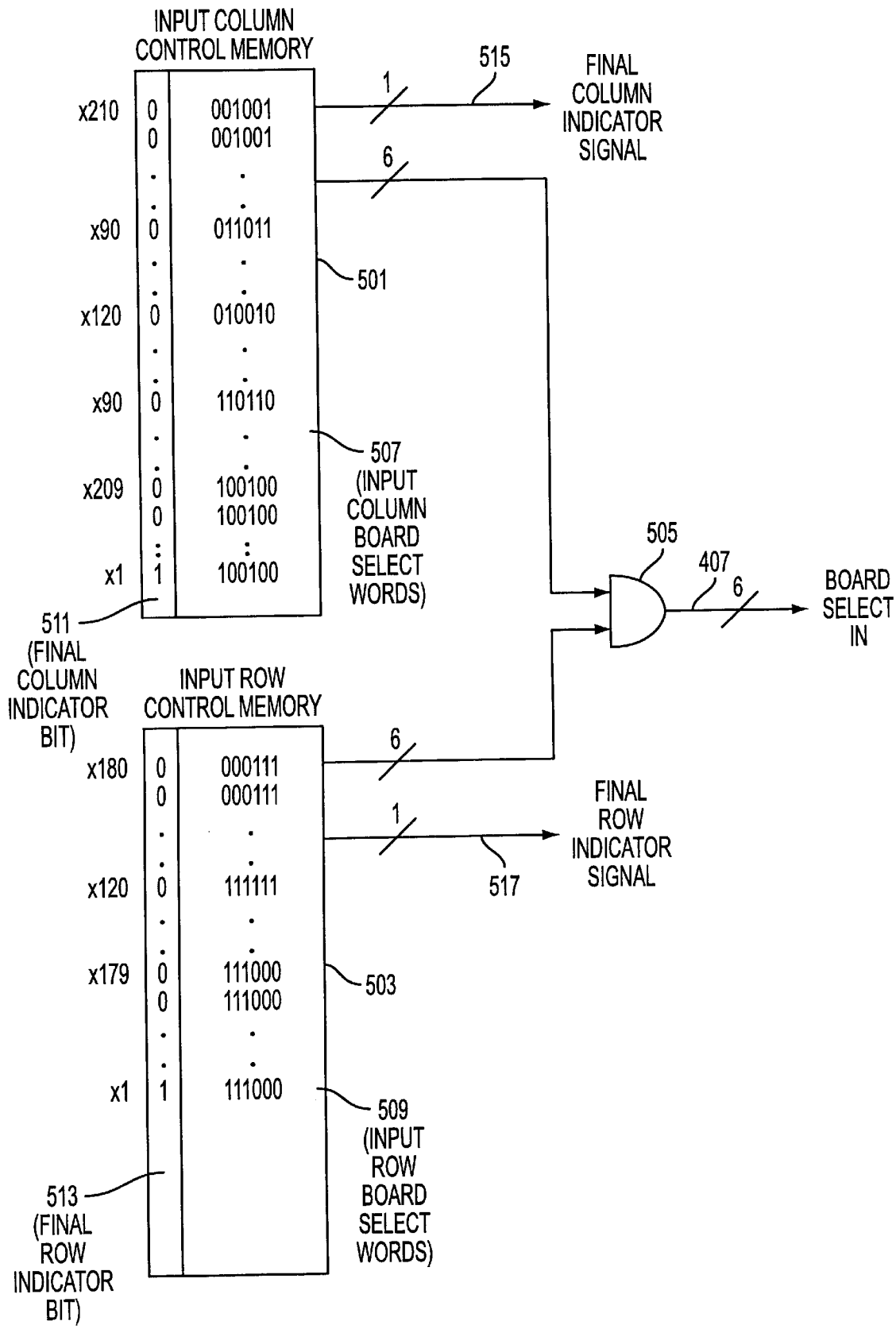
FIG. 5a illustrates an input column control memory and an input row control memory, in accordance with an aspect of the invention.

In order to provide programmable control of pixel distribution from the I/O board 301 to the processor boards 303, the input distributer 403 on the I/O board 301 includes an input column control memory 501 and an input row control memory 503 as shown in FIG. 5*a*. The input column and row control memories 501, 503 are each configured to operate as a rotating buffer, and may be implemented by many different types of memory components, including but not limited to first-in-first-out (FIFO) memory components. The input column control memory 501 stores, for each pixel column (as measured in the image frame 200), a board column select word. Similarly, the input row control memory 503 stores, for each pixel row (as measured in the image frame 200), a board row select word. Thus, for the exemplary image frame 200, the input column control memory 501 would store 720 board column select words, and the input row control memory 503 would store 480 input row select words. For each pixel that the input distributer 403 is to supply to the processor board interface 421, a board column select word is retrieved from the input column control memory 501 as a function of that pixel's column address, and a board row select word is retrieved from the input row control memory 503 as a function of that pixel's row address.

The width of each of the board row and board column select words corresponds to the number of processor boards 303 in the system 300. Each bit in the board column select word uniquely corresponds to one of the processor boards 303. Similarly, each bit in the board row select word uniquely corresponds to one of the processor boards 303. In the exemplary embodiment, in which 6 processor boards 303 are employed, each of the board column and board row select words is 6 bits in width. For a pixel to be loaded into any given one of the processor boards 303, that board's corresponding bits must be set to a value indicating "enable" (e.g., a logical "1", with a value of logical "0" denoting "nonenable") in both the board column and board row select words that correspond to the pixel's column and row addresses. The Board_Select_In signal 407 (which in this example is 6-bits wide) is generated by ANDing the input row board select word with the input column board select word. In the exemplary embodiment, an AND gate 505 is provided for this purpose. However, it will be readily apparent to those of ordinary skill in the art that the logical ANDing function could alternatively be provided by any number of alternative logic configurations. The individual bits of the Board_Select_In signal 407 may be routed to their corresponding processor boards 303 to alternatively enable or disable the loading of the present pixel (supplied on the Data_In line 405) onto that board 303 as a function of the value of the Board_Select_In bit.

The generation of proper address sequences for controlling the input column control memory 501 and the input row control memory 503 may be performed by means of counters and the like. However, in accordance with another aspect of the invention, proper address sequencing is advantageously generated without the use of extra counters by storing an extra address control bit along with each input column board select word and each input row board select word. More particularly, the input column control memory 501 stores an extra bit, referred to herein as the final column indicator bit 511, with each input column board select word 507. The input row control memory 503 similarly stores an extra bit, referred to herein as the final row indicator bit 513, with each input row board select word 509. Only the last final column indicator bit 511, stored with the last input column board select word 507, is initialized to a value indicating assertion (e.g., a binary "1"); all of the remaining final column indicator bits 511 are initialized to a value indicating non-assertion (e.g., a binary "0"). Similarly, only the last final row indicator bit 513, stored with the last input row board select word 509, is initialized to a value indicating assertion (e.g., a binary "1"); all of the remaining final row indicator bits 513 are initialized to a value indicating non-assertion (e.g., a binary "0").

During operation, addresses for the input column control memory 501 and input row control memory 503 are each initialized to point to the start of their respective control memories. The Board_Select_In signals 407 for distributing the first row of pixels are then generated by reading the first input row board select word 509 from the input row control memory 503, while simultaneously selecting and reading in turn the input column board select words 507 from the input column control memory 501, one for each pixel in the row. When the final input column board select word 507 has been read, its associated final column indicator bit 511 is output from the input column control memory 501 as well, thereby asserting the final column indicator signal 515. Assertion of the final column indicator signal 515 causes the address for the input column control memory 501 to be reset (so that it will start again from the first stored input column board select word 507), and also causes the address for the input row control memory 503 to be incremented, so that the next input row board select word 509 will be supplied by the input row control memory 503. Operation continues in this manner until the final input row board select word 509 and its associated final row indicator bit 513 are emitted from the input row control memory 503. Because of its initial setting, the final row indicator bit 513 causes the final row indicator signal 517 to be asserted. Addresses for the input column control memory 501 continue to increment until the last address is reached, at which point the final column indicator signal 515 is asserted. Assertion of both the final column indicator signal 515 and the final row indicator signal 517 causes addresses for both the input column control memory 501 and the input row control memory 503 to be reset to point to the first entries contained therein. The input distributer 403 is then ready to generate Board_Select_In signals 407 for the next image frame 200.

In the above example, pixels that make up the image frame 200 were distributed to the processor boards 303 one row at a time. This is not essential to the invention, however. Those skilled in the art will readily understand how to adapt the principles underlying this aspect of the invention to develop a logic control structure whereby pixels that make up an image frame 200 are distributed to the processor boards 303 one column at a time instead of one row at a time.

Figure 5B:
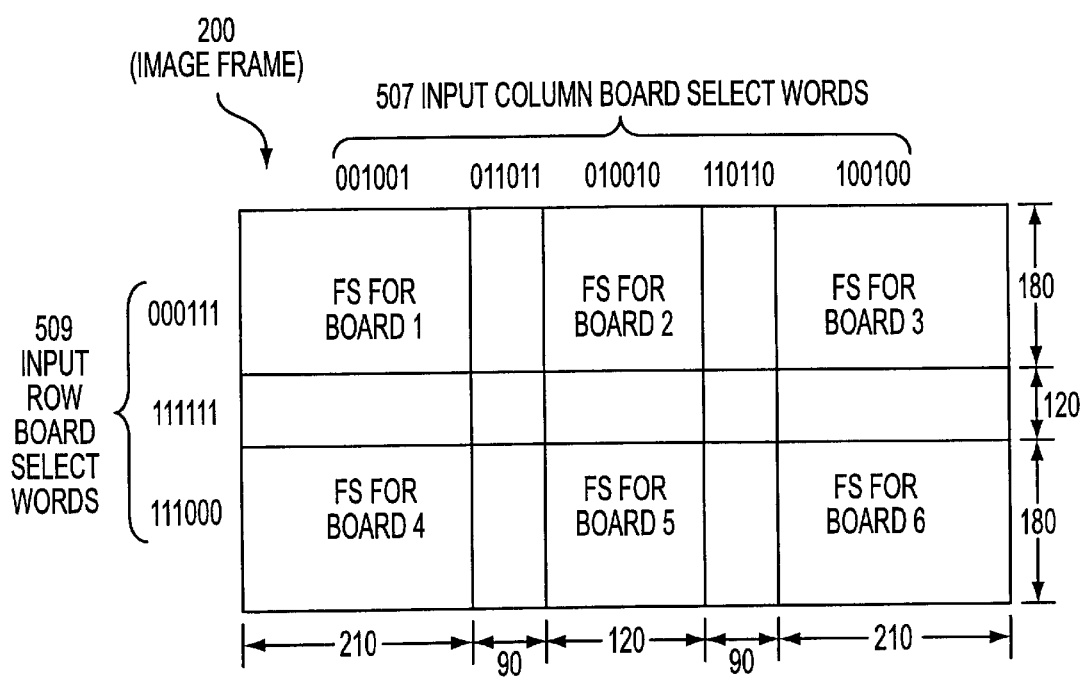
FIG. 5b illustrates how values for the input column board select words and the input row board select words may be readily determined.

As is illustrated in FIG. 5b, values for the input column board select words 507 and the input row board select words 509 are readily determined by observing, for each row or column of the image frame 200, which boards are to receive the pixels in that row or column. For example, with columns numbered 1 through 720 (left-to-right) and rows numbered 1 through 480 (top-to-bottom), it can be seen that column 250 is an overlap region with some pixels being sent to only boards 1 and 2, some pixels sent to boards 1, 2, 4 and 5, and some pixels sent to only boards 4 and 5. The input column board select word 507 is generated by taking the union of these sets, so the input column board select word 507 for column 250 is therefore "011011" (where the 6 bits in the input column board select word 507 board control bits respectively represent boards 6-5-4-3-2-1, in that order). In this example, it can be seen that all of the pixels located in columns 211 through 300 are similarly situated, and will therefore also have an input column board select word 507 having a value of "011011".

Taking an example from the rows, it can be seen that row 350 includes some pixels that are to be sent only to board 4, some pixels that are to be sent to both boards 4 and 5, some pixels that are to be sent only to board 5, some pixels that are to be sent to both boards 5 and 6, and some pixels that are to be sent only to board 6. The input row board select word 509 is generated by taking the union of these sets, so the input row board select word 509 for the pixels in row 350 is "111000", again with the bits in the input row board select word 509 respectively representing boards in the order 6-5-4-3-2-1.

Completing the example, the Board_Select_In signal 407 for the pixel located at row 350, column 250 is determined by ANDing 011011 with 111000 to give 011000. That pixel will therefore be sent only to boards 4 and 5.

Figure 6A:
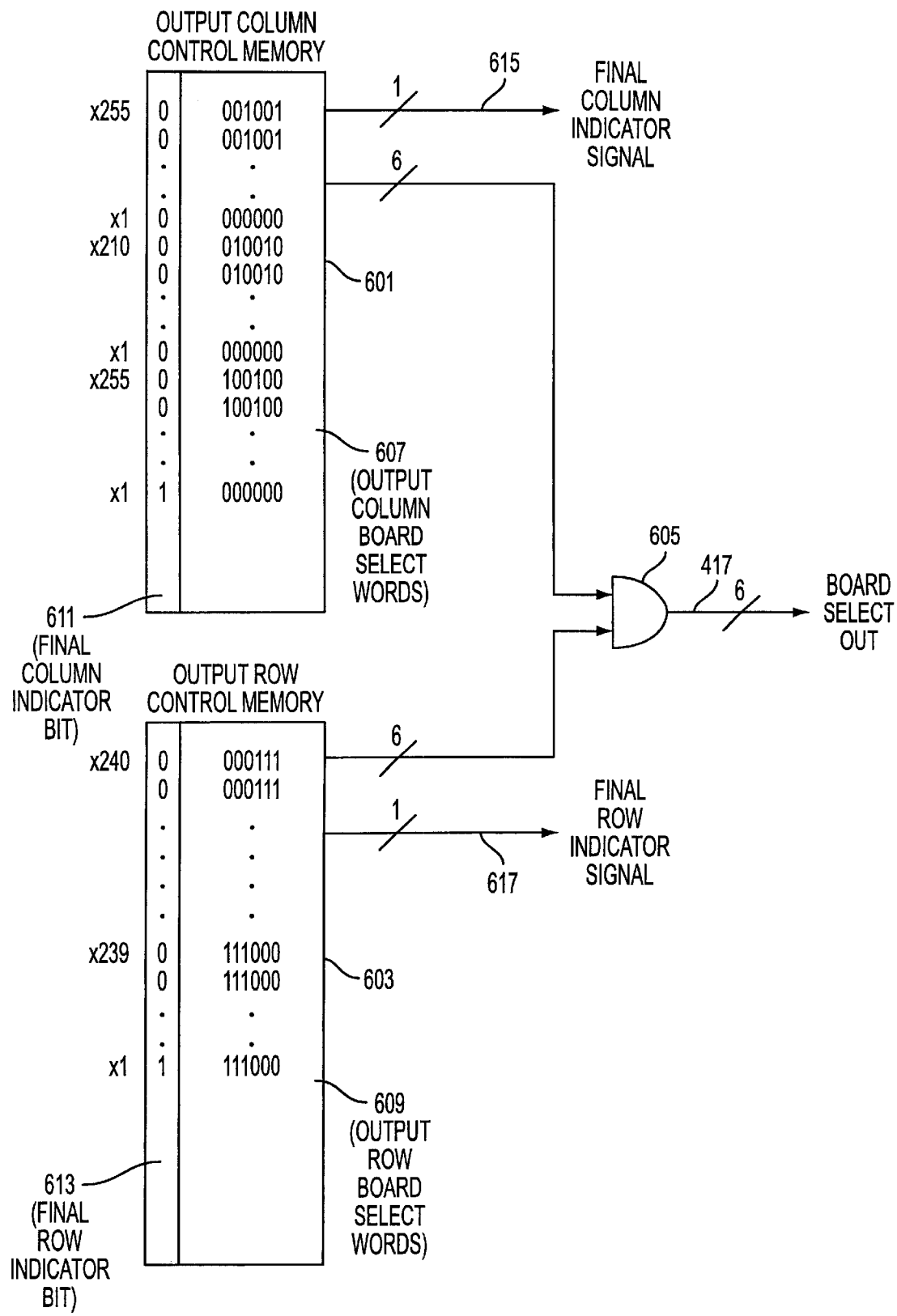
FIG. 6a illustrates an output column control memory and an output row control memory, in accordance with an aspect of the invention.

The strategy for generating the Board_Select_Out signals 417 is the same as that used for generating the Board_Select-In signals 407. As shown in FIG. 6a, the output collector 413 includes an output column control memory 601 and an output row control memory 603. The output column control memory 601 stores output column board select words 607, and in some embodiments also final column indicator bits 611. In these embodiments, the output column control memory 601 also supplies a final column indicator signal 615 at an output. (As indicated earlier, the use of final column indicator bits 611 and a final column indicator signal output 615 are not essential to practicing the invention.) The output row column control memory 603 similarly stores output row board select words 609, and in some embodiments also final row indicator bits 613. In these embodiments, the output row control memory 603 also supplies a final row indicator signal 617 as an output. (As indicated earlier, the use of final row indicator bits 613 and final row indicator signal 617 output are not essential to practicing the invention.) An AND gate 605 may be provided for generating the board select out signal 417 from the output column board select words 607 and output row board select words 609 supplied by the output column control memory 601 and output row control memory 603, respectively. Use of the AND gate 605 is not essential to practicing the invention; alternative circuit arrangements could be used to generate the board select out signal 417 from the output column board select words 607 and output row board select words 609.

Figure 6B:
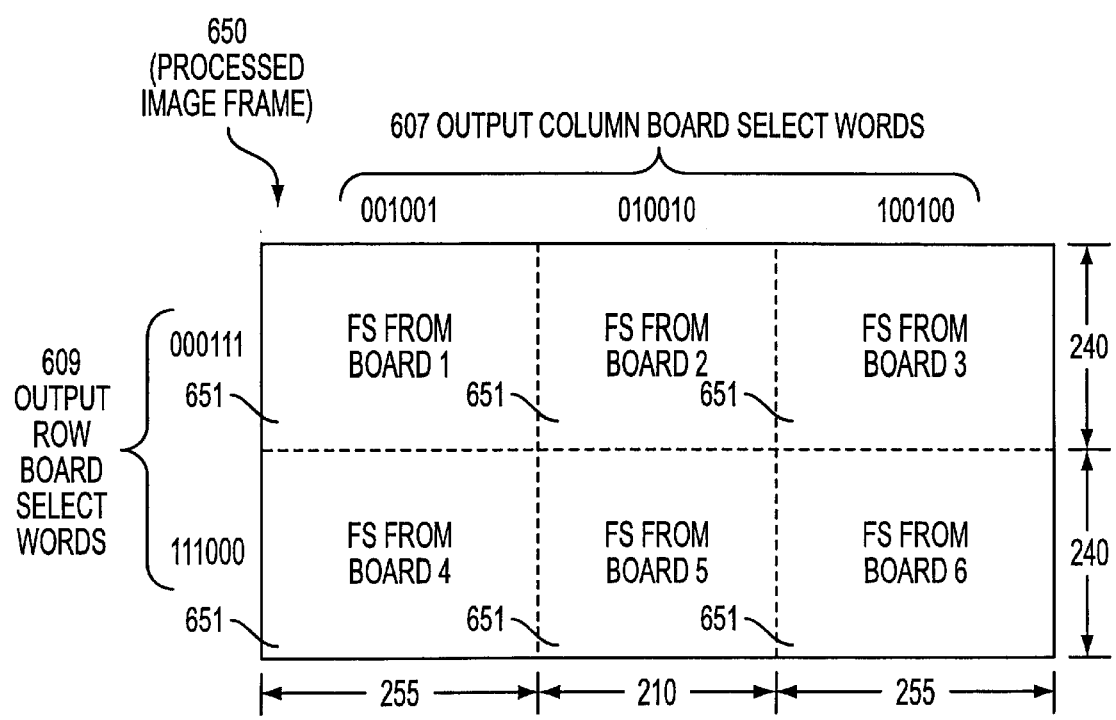
FIG. 6b illustrates how values for the output column board select words and the output row board select words may be readily determined.

The elements depicted in FIG. 6a operate analogously to those described above with respect to FIG. 5a, and so a detailed discussion of their operation will not be repeated. Rather, only the differences will be discussed. As can be seen from the processed image frame 650 depicted in FIG. 6b, the primary difference between the input and output strategies is that no overlap is employed during output. Output column board select words 607 combine with output row board select words 609 to form the Board_Select_Out signals 417 with one and only one select bit set for each pixel.

In some embodiments, there is the potential for two or more processor boards 303 to attempt to simultaneously drive data onto the same bus. This can occur during brief moments when a transition is being made from selection of one board 303 to selection of another. To prevent such occurrences, one or both of the output column and row control memories 601, 603 can be further programmed to include, at appropriate locations, output column and/or board select words 607, 609 in which none of the select bits are set. In the exemplary embodiment illustrated in FIG. 6a, one of these "all zero" output column board select words 607 is inserted between those output column board select words 607 which, if applied in succession, cause a transition between one or more boards 303 to occur, that is, after the first 255 output column board select words 607, again after the next 210 output column board select words 607, and again after the next 255 output column board select words 607.

The use of the input and output row and column control memories 501, 503, 601, 603 is a simple means for providing programmable control of the distribution and collecting processes. The contents of these control memories can easily be changed to accommodate different sized image frames 200, different numbers of processor boards 303, different degrees of overlap between frame segments 207, and different raster orders including multiple fields associated with interlaced images. Each processor board 303 receives a frame segment 207 from the I/O board 301, processes the frame segment 207, and provides an output frame segment (processed frame segment 651) to the I/O board 301. While some areas of the frame segment 207 may represent overlap with frame segments 207 sent to other processor boards 303, the output frame segment is "trimmed" prior to output so that the I/O board 301 can easily reconstruct the processed image frame 650 by abutment of output (processed) frame segments 651.

Up to this point, it has been assumed that each processor board 303 is capable of performing the required processing of the input frame segment 207 supplied without generating its own edge effect-related artifacts. However, as mentioned earlier, if the size of the PE array on a processor board 303 is smaller than the input frame segment 207, some strategy, such as overlapping subframes must be applied. In accordance with another aspect of the invention, the same strategy as described above, employing one or more control memories to provide pixel input and output controls, can be used to facilitate the distribution of pixels to and from particular PEs located on a single processor board 303. This aspect of the invention will now be described with reference to an exemplary embodiment.

Figure 7:
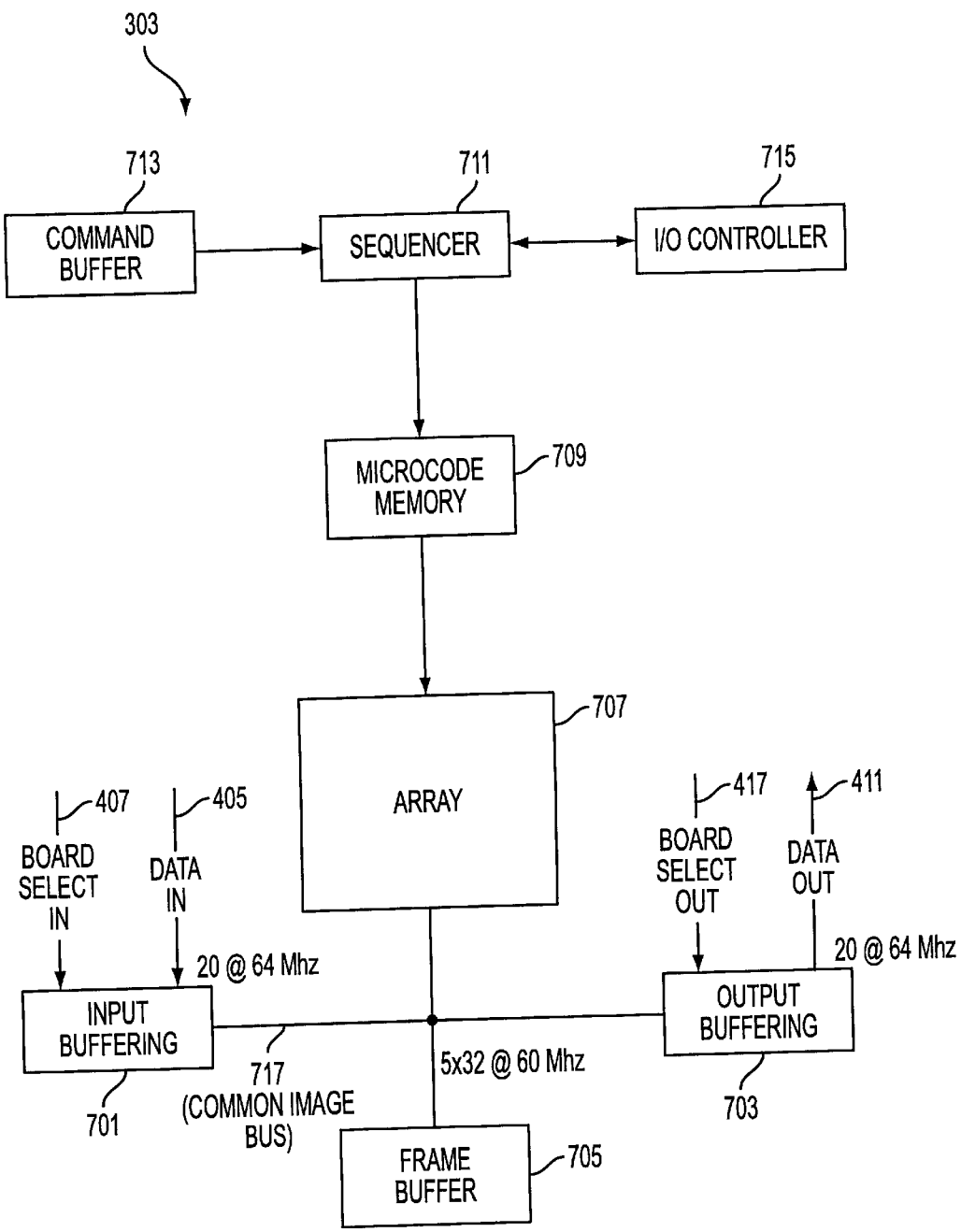
FIG. 7 is a block diagram of an exemplary processor board in accordance with an aspect of the invention.

Referring now to FIG. 7, an exemplary processor board 303 is shown. The processor board 303 comprises an input buffering stage 701, an output buffering stage 703, a frame buffer 705, and a processor array 707. Instructions for controlling the processor array 707 are supplied by a microcode memory 709, which receives its addresses from a sequencer 711. The sequencer in turn is controlled by commands supplied by a command buffer 713. The sequencer 711 further interacts with an on-board I/O controller 715. The sequencer 711 provides commands to the I/O controller 715, and receives state ("handshake") signals from the I/O controller 715.

The processor array 707 is coupled to the input buffering stage 701, output buffering stage 703 and frame buffer 705 by means of a common image bus 717, which in the exemplary embodiment is 5×32=160 bits wide and operates at 60 MHz. The I/O controller 715 is responsible for controlling the movement of data between the input buffering stage 701 and the frame buffer 705; between the frame buffer 705 and the processor array 707 (both directions); and between the frame buffer 705 and the output buffering stage 703.

In the exemplary embodiment, the processor array 707 is a 160×160 array of PEs, each having a 1-bit wide architecture (i.e., the processing of multi-bit operands by any one of the PEs requires the performance of multiple instructions). The PE array is arranged as a SIMD architecture, so that the PEs operate in lock-step as each new microcode instruction is supplied by the microcode memory 709. The processor array 707 is preferably implemented as a 5×5 array of processor array ICs, each IC itself comprising a 32×32 array of 1-bit wide PEs. The processor array IC may, for example, be that which is described in U.S. patent application No. 08/112,540, filed on Aug. 27, 1993 in the name of Woodrow L. MEEKER ("Parallel Data Processor"), which is hereby incorporated herein by reference in its entirety. However, use of this particular IC is not essential to practicing the invention. Any similar type of processor array IC, such as, but not limited to, that which is described in U.S. patent application Ser. No. 09/057,482, filed on Apr. 9, 1998 in the name of Abercrombie et al. ("Mesh Connected Computer") can be used instead. The disclosure of U.S. patent application No. 09/057,482 is hereby incorporated herein by reference in its entirety. The processor array ICs are interconnected with one another so that, during processing, they behave like a 160×160 PE array, with each PE being able to exchange information with its neighbors which may be found to its NORTH, EAST, SOUTH AND WEST.

Figure 8:
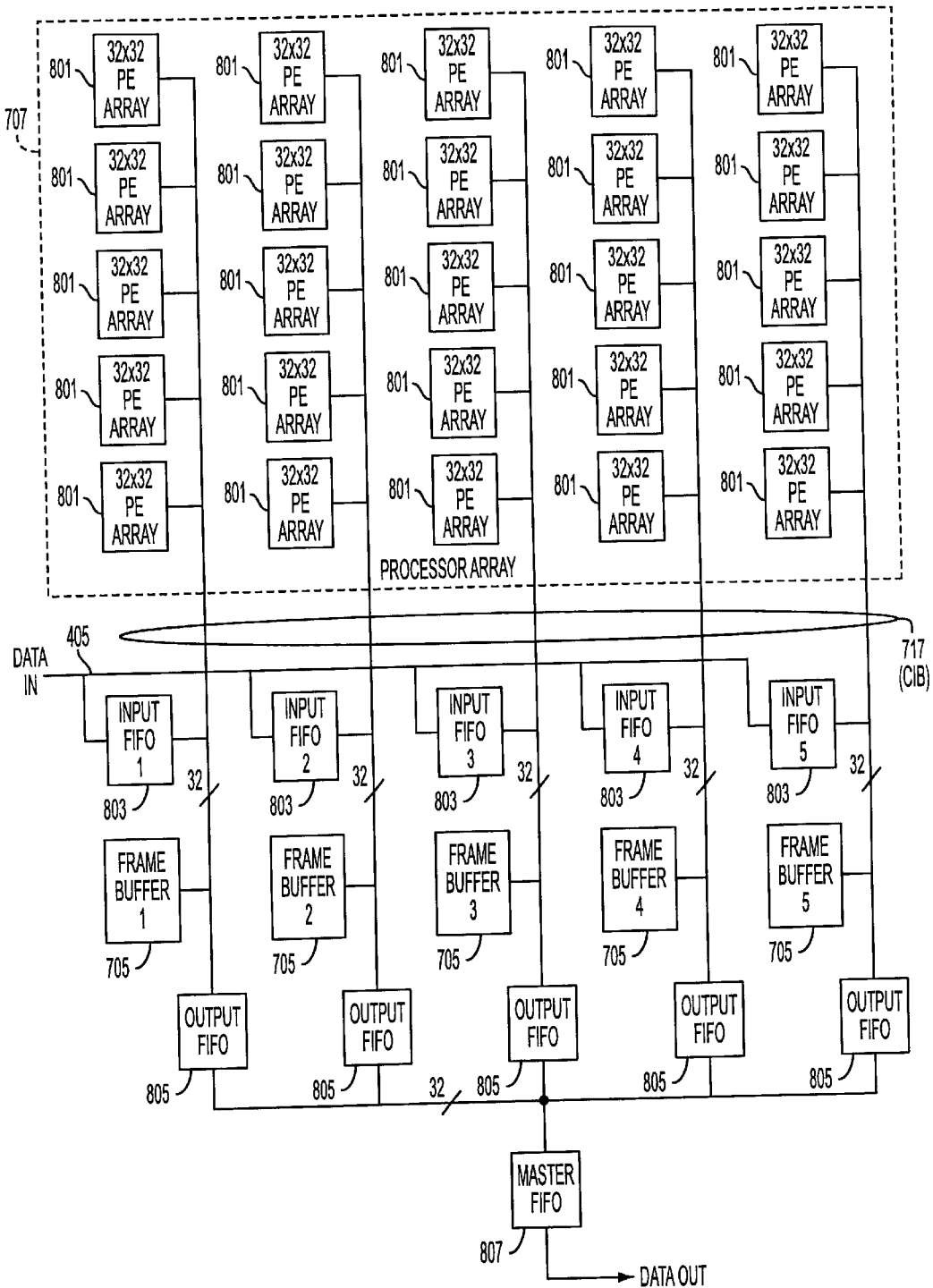
FIG. 8 is a block diagram of those components of the processor board that are most relevant to receiving and supplying data in connection with the board's input and output functions, in accordance with an aspect of the invention.

FIG. 8 illustrates those components of the processor board 303 that are most relevant to receiving and supplying data in connection with the board's input and output functions. In particular, FIG. 8 shows a 5×5 array of 32×32 PE array ICs 801 that make up the processor array 707. Also shown is the frame buffer 705 as well as an input FIFO 803 that is part of the input buffering stage 701. The input FIFO 803 receives data from the Data_In line 405, and makes data available on the common image bus 717. The outputting of data from the processor board 303 is supported by an output FIFO 805 in conjunction with a master FIFO 807, as will be explained in greater detail below.

Because of the high data throughput required within the processor board 303, the input FIFO 803, output FIFO 805, frame buffer 705 and processor array 707 are arranged as multiple column channels. This permits data to flow on each of the five channels simultaneously. As shown in FIG. 8, the exemplary embodiment of the processor board employs five column channels. Specifically, each column of PE array Cs 801 provides a 32 bit path for the input and output of image data. Each channel of the input FIFO 803, output FIFO 805 and frame buffer 705 also provides a 32 bit path for data movement. The 160-bit common image bus (CIB) 717 interconnects the five 32-bit channels of the input FIFO 803, output FIFO 805, frame buffer 705 and processor array 707 channels. At any given time one of the following tasks may be performed: 1) transfer of a frame segment 207 from the input FIFO 803 to the frame buffer 705, 2) input of a subframe (described below in detail) from the frame buffer 705 to the processor array 707, 3) output of a processed subframe from the processor array 707 to the frame buffer 705 and 4) transfer of a processed frame segment from the frame buffer 705 to the output FIFO 805. In practice these tasks may be time multiplexed so that effective sharing of the common image bus 717 is provided.

It is emphasized that the partitioning of the processor board 303 into channels as described above prevents the cross-communication of data between channels during the above mentioned data movement tasks. However, the processor array 707 is not partitioned in this manner with respect to its ability to process subframe data. That is, pixel data may freely move horizontally (east-west) as well as vertically (north-south) within the processor array 707 during processing.

Continuing the examples described above with reference to FIGS. 2, 5b and 6b, there is an apparent sizing discrepancy: The size of each frame segment 207 that is sent to a processor board 303 for processing is 300×300, but the size of the processor array 707 located on that board is only 160×160. In accordance with another aspect of the invention, this discrepancy is resolved by having the processor board 303 divide each frame segment 207 into one or more array-sized overlapping "subframes" 901 for processing by the array processor 707. Using the numbers of the present example, the 300×300 frame segment 207 may be segmented into 4 overlapping subframes of 160×160 pixels for processing by the 160×160 processor array 707. The processor board 303 processes each subframe 901 in turn and provides processed subframes for constructing a processed frame segment by discarding the appropriate overlap region of each processed subframe, thereby allowing edge effect regions to be discarded in the same way as was fully described with respect to overlapping frame segments 207.

In accordance with an aspect of the invention, distributing and reconstructing subframes 901 into processed frame segments 651 is the same in principle as distributing and reconstructing processed frame segments 651 into processed image frames 650. While frame segments 207 are distributed to separate processor boards 303 within a system 300, subframes 207 are distributed for processing in separate time slots within a single processor array 707. Because subframes 207 are processed separately, vertical and horizontal overlap must be employed in order to eliminate edge effects, just as overlap is employed at the frame segment level of processing.

Figure 9:
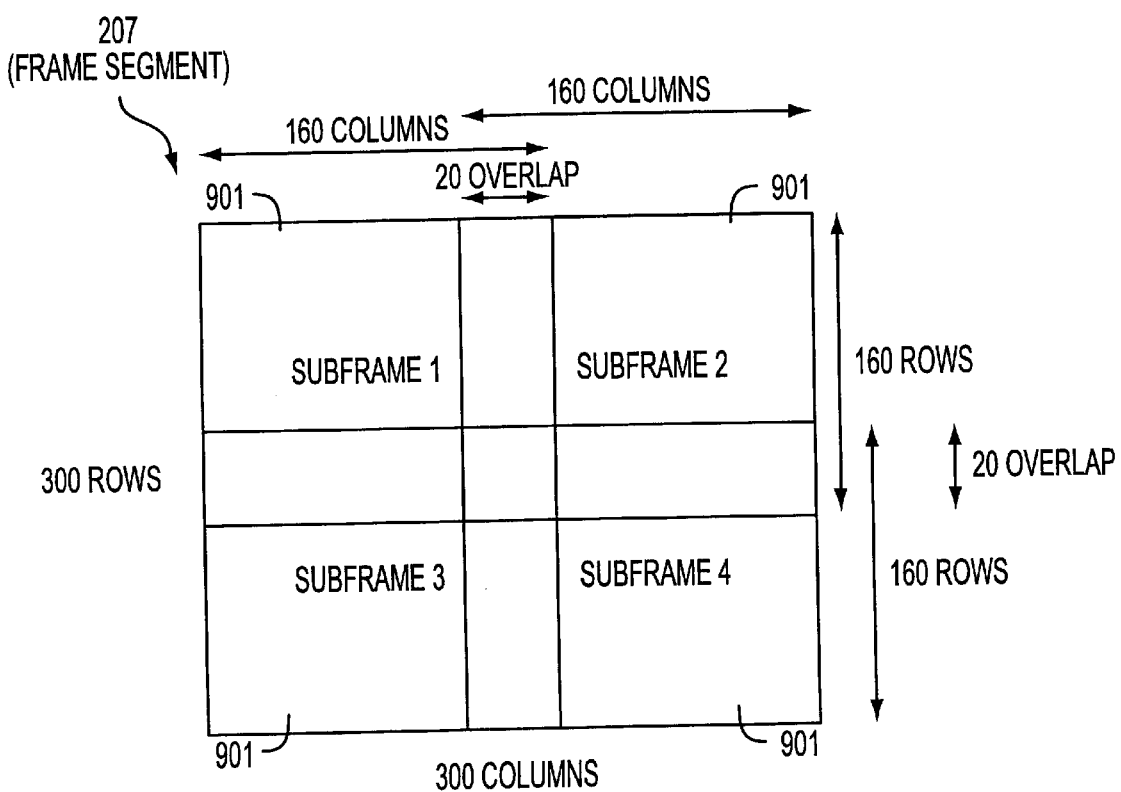
FIG. 9 is a diagram of a frame segment that has been divided up into one or more array-sized overlapping "subframes", in accordance with an aspect of the invention.
Figure 10:
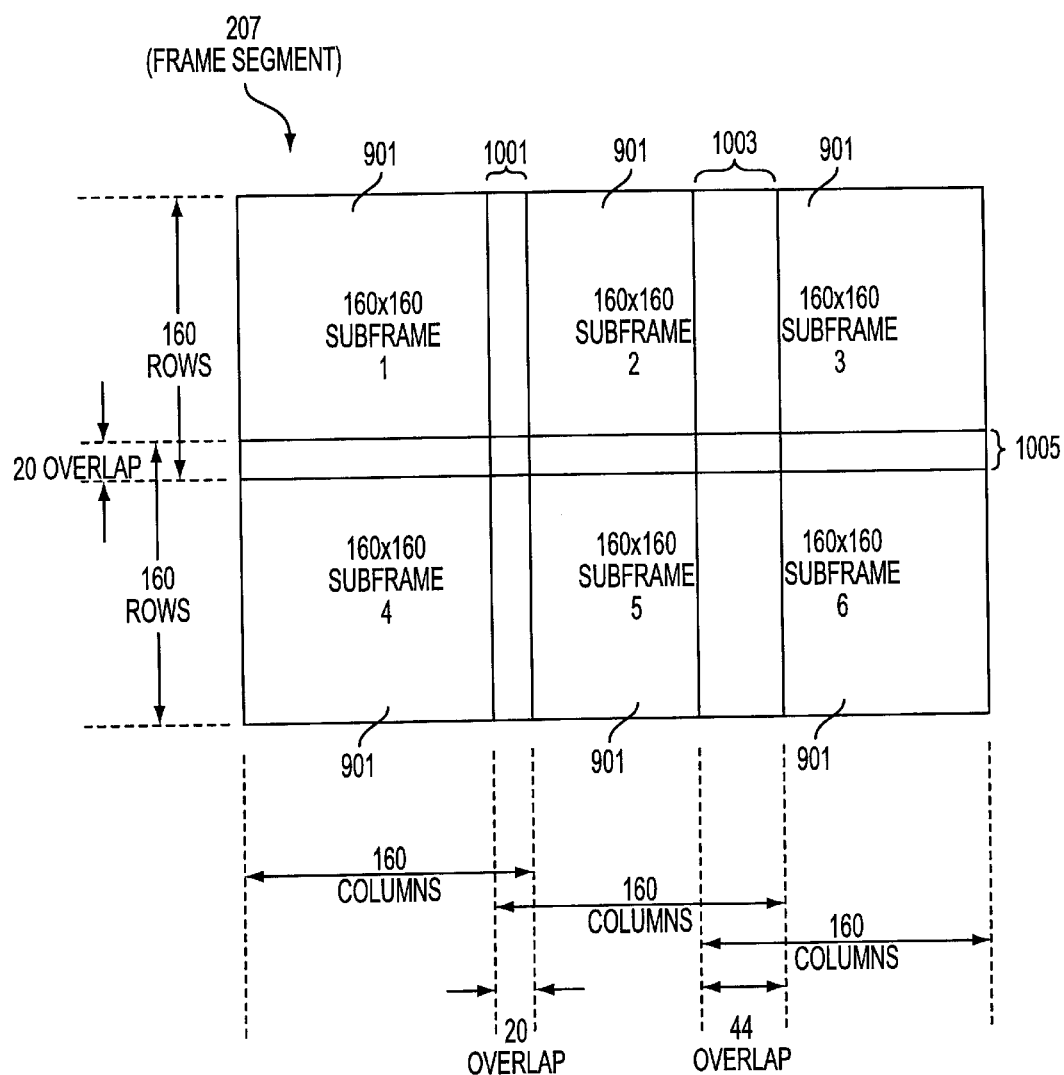
FIG. 10 illustrates a 300×416 pixel frame segment that has been partitioned into six overlapping subframes, each dimensioned at 160×160 pixels.

The 300×300 subframes 901 depicted in FIG. 9 have only one vertical and one horizontal overlap region. To aid in the understanding of how the inventive board level input/output techniques facilitate the use of overlapping subframes 901, and also to illustrate the versatility that the invention affords the designer, the next examples will assume that a frame segment 207 to be processed by a processor board 303 is even wider. In particular, it will be assumed that a frame segment 207 to be processed is dimensioned at 300×416. This permits the use of an example in which there are two vertical overlap regions between subframes 901, as shown in FIG. 10. More particularly, FIG. 10 illustrates a 300×416 pixel frame segment 207 that has been partitioned into six overlapping subframes 901, each dimensioned at 160×160 pixels. To illustrate the versatility of the invention, the amount of horizontal overlap is not evenly distributed between subframes 901. Rather, the amount of horizontal overlap between the first and second subframes 901, as well as that between the fourth and fifth subframes 901, is 20 pixels. By contrast, the amount of horizontal overlap between the second and third subframe 901, as well as that between the fifth and sixth subframe 901 is 44 pixels.

As each frame segment 207 is received by the processor board 303, it is moved from the input buffering stage 701 to the frame buffer 705 for storage. A subframe 901 is processed by moving it from the frame buffer 705 to the processor array 707, processing the subframe 901 in the array, and moving the processed subframe back to the frame buffer 705. The arrangement of data in the frame buffer 705 must therefore accommodate the movement of subframe data to and from the processor array.

To understand how data is arranged in the frame buffer 705, it is important to recognize that there are two possible types of overlapping regions within frame segment 207: horizontal overlap, and vertical overlap. The exemplary frame segment 207 depicted in FIG. 10 has two (first and second) horizontal overlap regions 1001, 1003 and one vertical overlap region 1005. To accommodate the storage of vertically overlapping subframes 901, these may be treated as super-subframes that each comprise the combined data from such overlapping subframes 901. Considering for example the frame segment 207 depicted in FIG. 10, the first and fourth subframes 901 form a first super-subframe comprising 160 columns and 300 rows. Similarly, the second and fifth subframes 901 form a second super-subframe, and the third and sixth subframes 901 form a third super-subframe, with each of the second and third super-subframes comprising 160 columns and 300 rows. It is then necessary only to store each of the first, second and third super-subframes into the frame buffer 705 one row at a time (i.e., in which sequential frame buffer addresses access horizontally adjacent pixels within a given row). Nothing else need be done for the purpose of accommodating vertical overlap regions, such as the vertical overlap region 1005. When, for example the higher of two vertically overlapping subframes 901 (e.g., the first subframe 901) is to be moved into the processor array 707, the frame buffer's start address may simply be set to point to the first pixel in the first row, and then incremented to point to the next pixels in the same row and then to the next row until the final pixel in the final row of the subframe 901 has been accessed. When it is next desired to move the lower of the two vertically overlapping subframes 901 (e.g., the fourth subframe 901) into the processor array 707, the same process is followed, but with the initial address set to point to the first row and column of the lower subframe 901 (e.g., the fourth subframe 901). Thus, for purposes of storing vertically overlapping subframes 901 within the frame buffer 705, the fact that there are distinct subframes 901 can be ignored, with all of the pixels lying anywhere within the vertically overlapping subframes 901 (i.e., the super-subframe) being stored in sequence.

Figure 11:
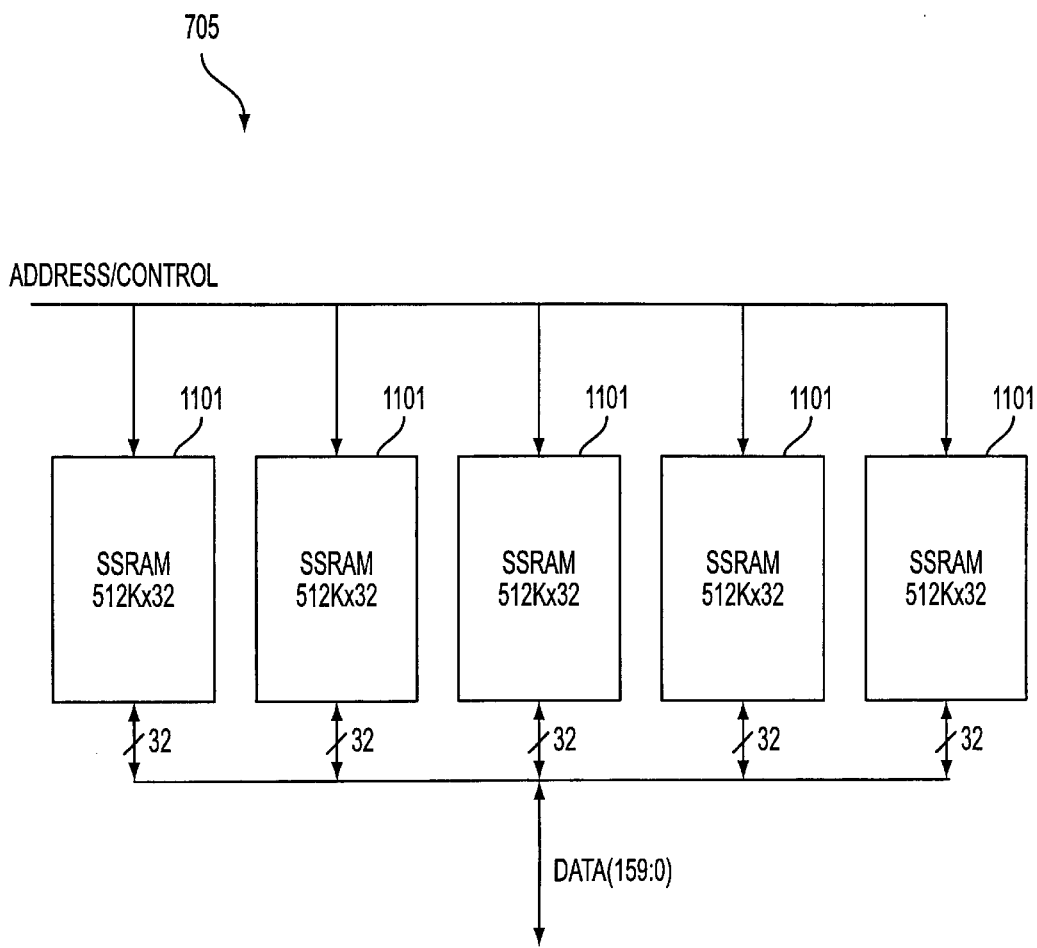
FIG. 11 is a block diagram of an exemplary embodiment of the frame buffer, in accordance with an aspect of the invention.

The same is not true with respect to horizontally overlapping subframes 901, however. This is because, as mentioned earlier, the frame buffer 705 and processor array columns are partitioned into channels. FIG. 11 is a block diagram of an exemplary embodiment of the frame buffer 705, in which it can be seen that five 32-bit wide memory components 1101, such as SSRAM components, are arranged in parallel to form a 160-bit wide memory resource. Each of the memory components 1101 receives and supplies 32 bits of data for movement on a corresponding one of the five channels. There is no possibility for a pixel stored in the memory component 1101 associated with one of the channels to be loaded into or retrieved from a PE associated with a different one of the channels.

Since, for purposes of data movement on the processor board 303, there is no cross-communication between channels, each frame buffer channel must contain all information necessary for processing subframes 901 within the corresponding channel of the processor array 707. The distribution of horizontally overlapping subframes 901 must therefore provide for data located in horizontal overlap regions (e.g., the first and second horizontal overlap regions 1001, 1003) to be stored within more than one frame buffer channel.

Figure 12:
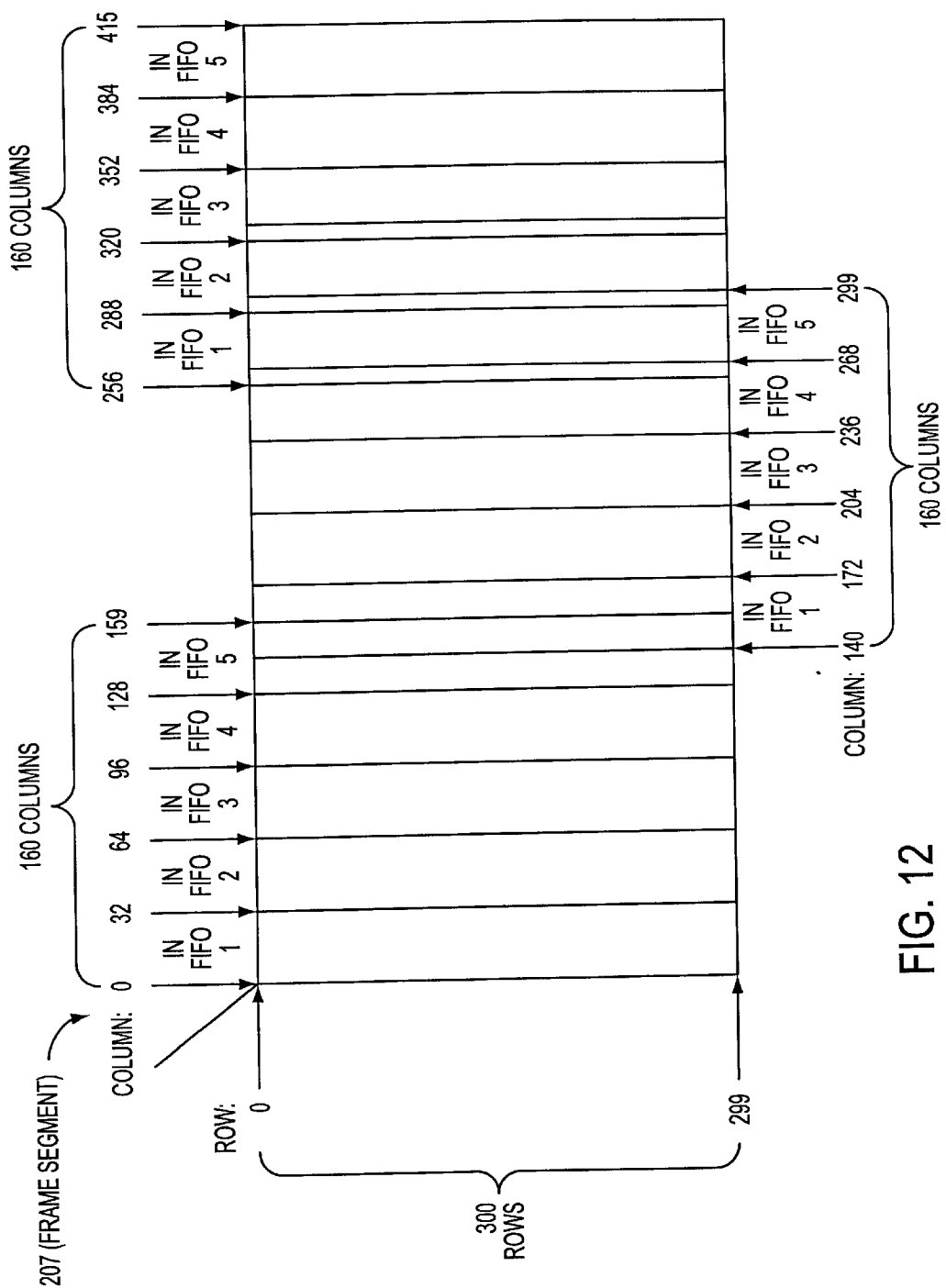
FIG. 12 illustrates how the pixels of the exemplary subframes of FIG. 10 would be distributed among the five channels of the input FIFO in accordance with an aspect of the invention.

FIG. 12 illustrates how the pixels of the exemplary subframes 901 of FIG. 10 would be distributed among the five channels of the input FIFO 803. Pixels are received from the I/O board 301 one frame segment row at a time. Thus, for each row in the frame segment 207, pixels associated with columns 0 through 31 would be stored into channel 1 of the input FIFO 803; pixels associated with columns 32 through 63 would be stored into channel 2 of the input FIFO 803, and so on. Pixels located in horizontally overlapping regions are stored into more than one channel of the input FIFO 803. For example, pixels associated with columns 140 through 159 are distributed to both channel 1 as well as channel 5 of the input FIFO 803. Pixels associated with columns 160 through 171 are then stored only into channel 1 of the input FIFO 803, since these are not in a horizontally overlapping region. The process of distributing pixels associated with the remaining columns of the frame segment 207 continues in a like manner. When the pixel associated with the final column (i.e., column 415 in this example) is received and stored into the input FIFO 803, the process continues with the pixels associated with the columns of the next row in the frame segment 207. Because pixels are received and stored one frame segment row at a time, the rows of any one super-subframe are not stored contiguously within the input FIFO 803, but rather are interleaved with the rows of the other super-subframes that make up the frame segment 207.

Figure 13:
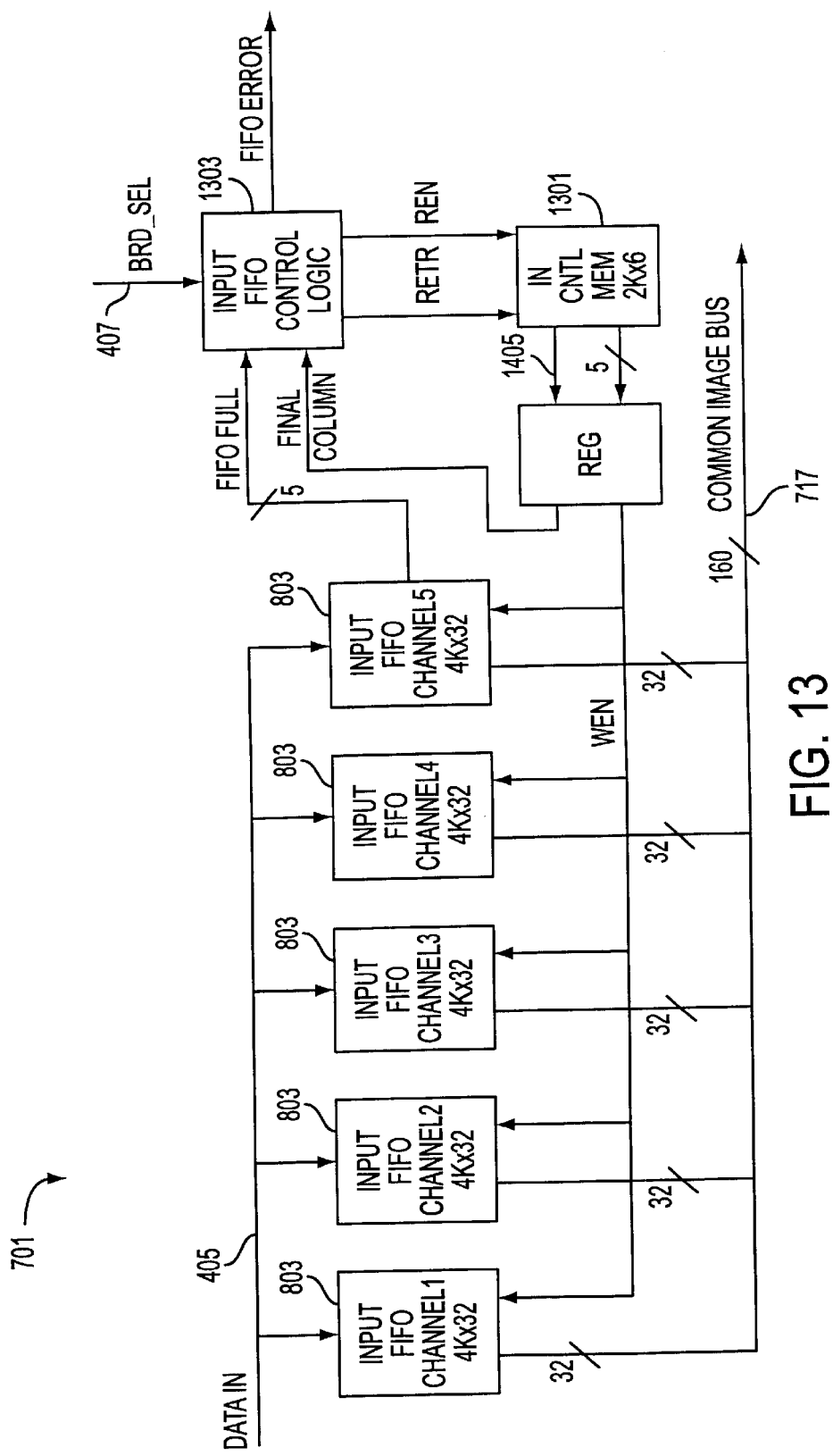
FIG. 13 is a block diagram of an input buffering stage, in accordance with an aspect of the invention.

In order to provide for distribution of pixels as just described, an input buffering stage 701 as depicted in greater detail in FIG. 13 is provided. The input buffering stage 701 provides the appropriate distribution of frame segment data to the channels of the input FIFO 803 as the data is received from the I/O board 301. Control for the distribution of the data is similar to that used by the I/O board 301. Since only horizontal overlap of subframes 901 is handled by the distribution logic, only a single control memory (the input control memory 1301), analogous to the input column control memory 501 of the I/O board 301, is required. This input control memory 1301 provides a FIFO select word for each pixel that is received. The input control memory 1301 is configured to operate as a rotating buffer, and may be implemented by many different types of memory components, including but not limited to FIFO memory components.

Figure 14:
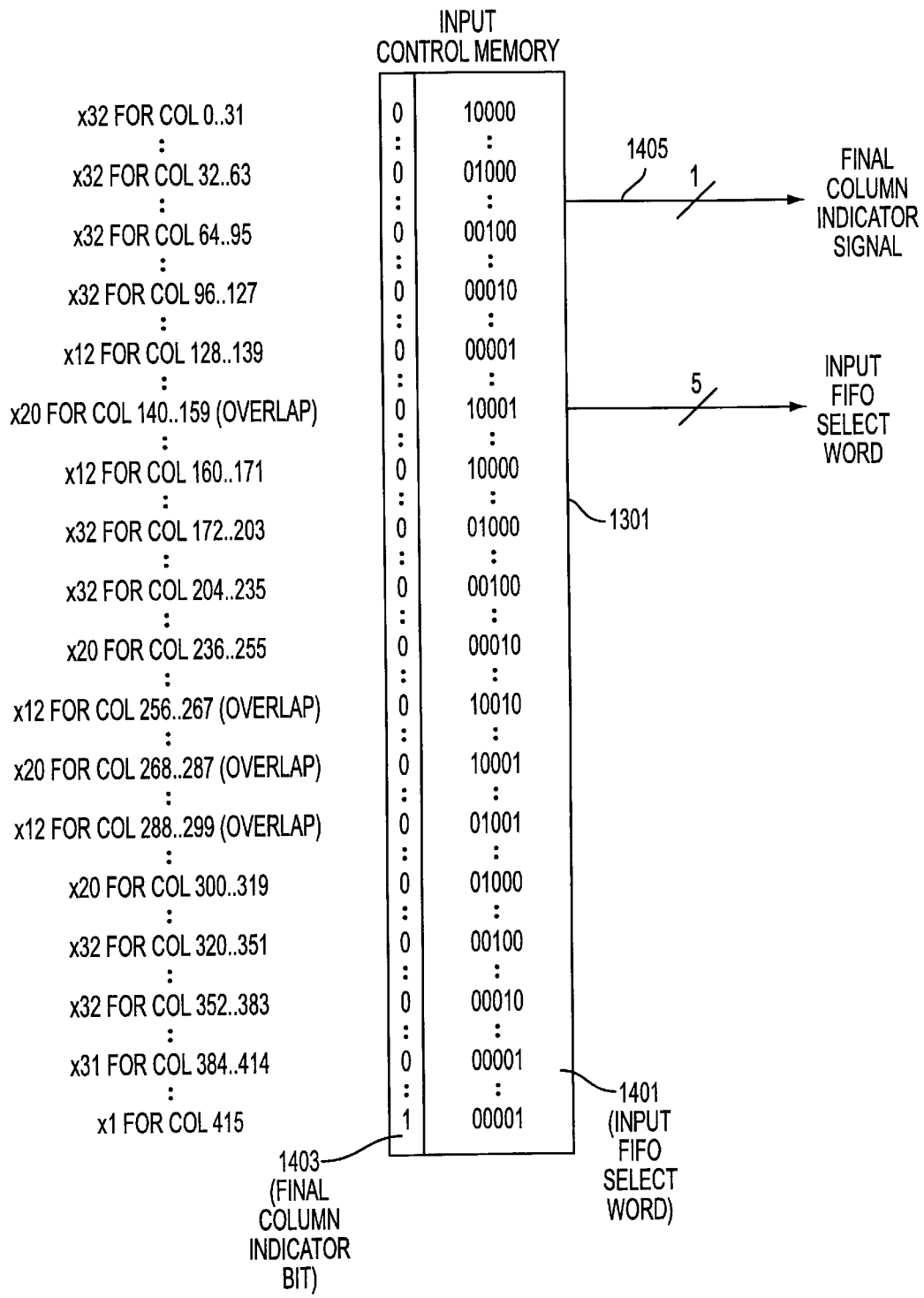
FIG. 14 depicts an input control memory and exemplary contents, in accordance with an aspect of the invention.

The input control memory 1301 and exemplary contents are shown in greater detail in FIG. 14. The input control memory 1301 stores input FIFO select words 1401, one for each column in the frame segment 207. For each input FIFO select word 1401, the input control memory 1301 also stores a corresponding final column indicator bit 1403, which indicates whether the input FIFO select word 1401 corresponds to the final column in the frame segment 207. Each bit of the input FIFO select word 1401 provides a write enable signal for a corresponding channel of the input FIFO 803. At the completion of receipt of each frame segment row, the final column indicator signal 1405, which is supplied at the output of the input control memory 1301, is asserted. The final column indicator signal 1405 is supplied to input FIFO control logic 1303, which responds by causing the input control memory 1301 to again begin retrieving values from the initial starting point, so that the input FIFO 803 can receive and store pixels associated with a next row in the frame segment 207. Preferably at about the same time, the I/O controller 715 moves the data from the head of each channel of the input FIFO 803 to corresponding channels of the frame buffer 705, in order to prevent the input FIFO 803 from filling up. In this manner, frame segment data is moved from the input FIFOs 803 to the frame buffer 705.

The arrangement of horizontally subframed data in the frame buffer 705 is shown in FIG. 15. It may be observed that, within each frame buffer channel, the pixels associated with a particular row of the entire frame segment 207 are stored together in sequence. This arrangement reflects the order in which data is received and stored in the input FIFOs 803. This is also the order in which data is stored in the output FIFOs 805 for output to the I/O board 301.

Once the data has been loaded into the frame buffer 701, the next step is typically for it to be processed by the processor array 707. The movement of subframe data from the frame buffer 701 to the processor array 707 requires that the data for each row of the subframe be read in sequence. As shown in FIG. 15, the first 160 pixels (row 0) of subframe 0 are retrieved from addresses 0 through 31 of each of the five frame buffer channels. The next row, row 1, is reached by skipping the next 64 pixels, which belong to subframes 1 and 2 respectively. This interleaved arrangement of subframe data in the frame buffer 705 reflects the order in which input data is received from the input buffering stage 701 as well as the order in which output data is sent to the output buffering stage 703. For purposes of moving data between the processor array 707 and the frame buffer 705, however, it is necessary to provide an offset value reflecting the number of horizontally adjacent subframes to be skipped and the number of pixels per subframe per frame buffer channel (e.g., (3−1)*32=64). This offset allows the sequence of pixel accesses to skip from the end of one row to the beginning of the next for a given subframe 901 in the frame buffer 705.

Figure 16:
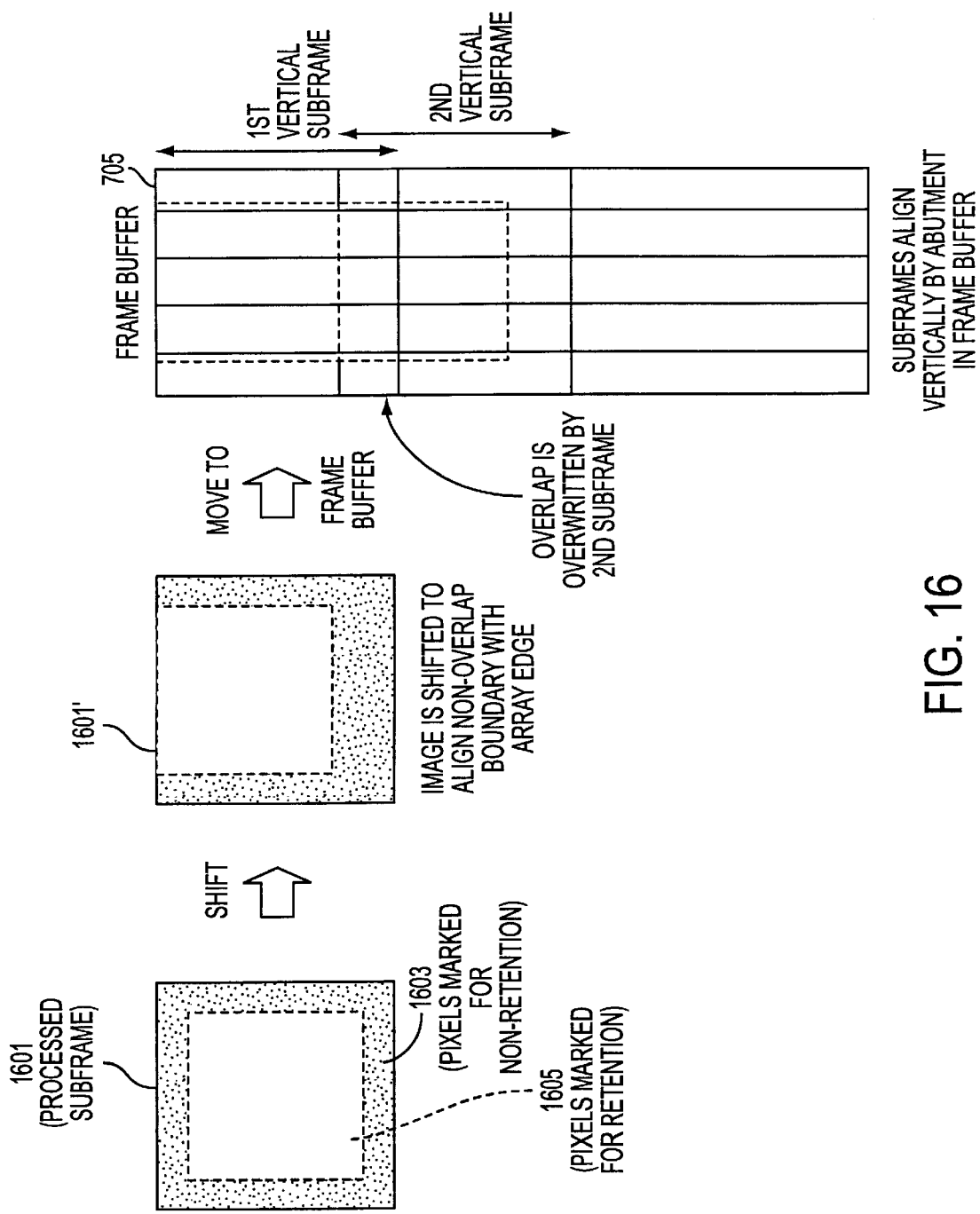
FIG. 16 illustrates how a border about a processed subframe 1601 may be marked for non-retention, the creation of a shifted processed subframe, and the movement of a shifted processed subframe to the frame buffer, in accordance with various aspects of the invention.

After each subframe 901 is processed by the processor array 707, it is prepared for vertical and horizontal reconstruction. The preparation for horizontal reconstruction comprises tagging each pixel for retention or non-retention. This tagging is performed by the processor array 707. As shown in FIG. 16, a border 1603 about the processed subframe 1601 is marked for non-retention. The remaining pixels 1605 are marked for retention. The marking may be accomplished by setting one bit of each pixel (e.g., the 32nd bit of each pixel) to 1 to indicate retention or to 0 to indicate non-retention. The preparation of the processed subframe 1601 for vertical subframing is accomplished by further using the processor array 707 to shift the image north until the non-overlap region aligns with the north edge of the array. The number of pixels to shift is preferably predetermined, and coded into the microsequence that controls the processor array 707. Also, the values of the pixels shifted in from the south of the processor array 707 are unimportant, and may simply be the same pixels that are shifted out of the north end of the processor array 707. The shifted processed subframe 1601' is depicted in FIG. 16. As further shown in FIG. 16, the shifted processed subframe 1601' is then moved to the frame buffer 705, under the control of the I/O controller 715. As each subsequent processed subframe is marked, shifted and written to the frame buffer 705, the north edge of the subsequent shifted processed subframe 1601' overwrites the overlap region 1603 on the southern boundary of the previous processed shifted subframe 1601'. In this manner, vertical reconstruction of frame segments 207 is accomplished by abutment of processed shifted subframes 1601' within the frame buffer 705. In order to simplify the depiction of the shifted processed subframes 1601' within the frame buffer 705, the interleaving of data associated with horizontally overlapping subframes has been omitted. It should be apparent from the earlier discussion that the consecutive rows of the first and second vertical subframes depicted in FIG. 16 are stored at addresses that are sufficiently offset with respect to one another to permit the storage of rows associated with horizontally adjacent subframes.

It should also be noted that the border 1603, indicating those pixels of the processed subframe 1601 that are marked for non-retention, is merely illustrative of one possibility, and in general will vary in dependence on how much horizontal and vertical overlapping the processed subframe 1601 has with each of its north, south, east and west neighboring subframes 901. It is further noted that whether a pixel is to be retained is determined not only by its status with respect to overlapping with other subframes 901, but also with respect to overlapping with other frame segements 207. It is the goal of this marking to indicate, for each processed pixel stored in the frame buffer 705, whether that processed pixel will ultimately make up a part of the processed image frame 650 (i.e., whether that pixel is part of a processed frame segment 651).

Figure 17:
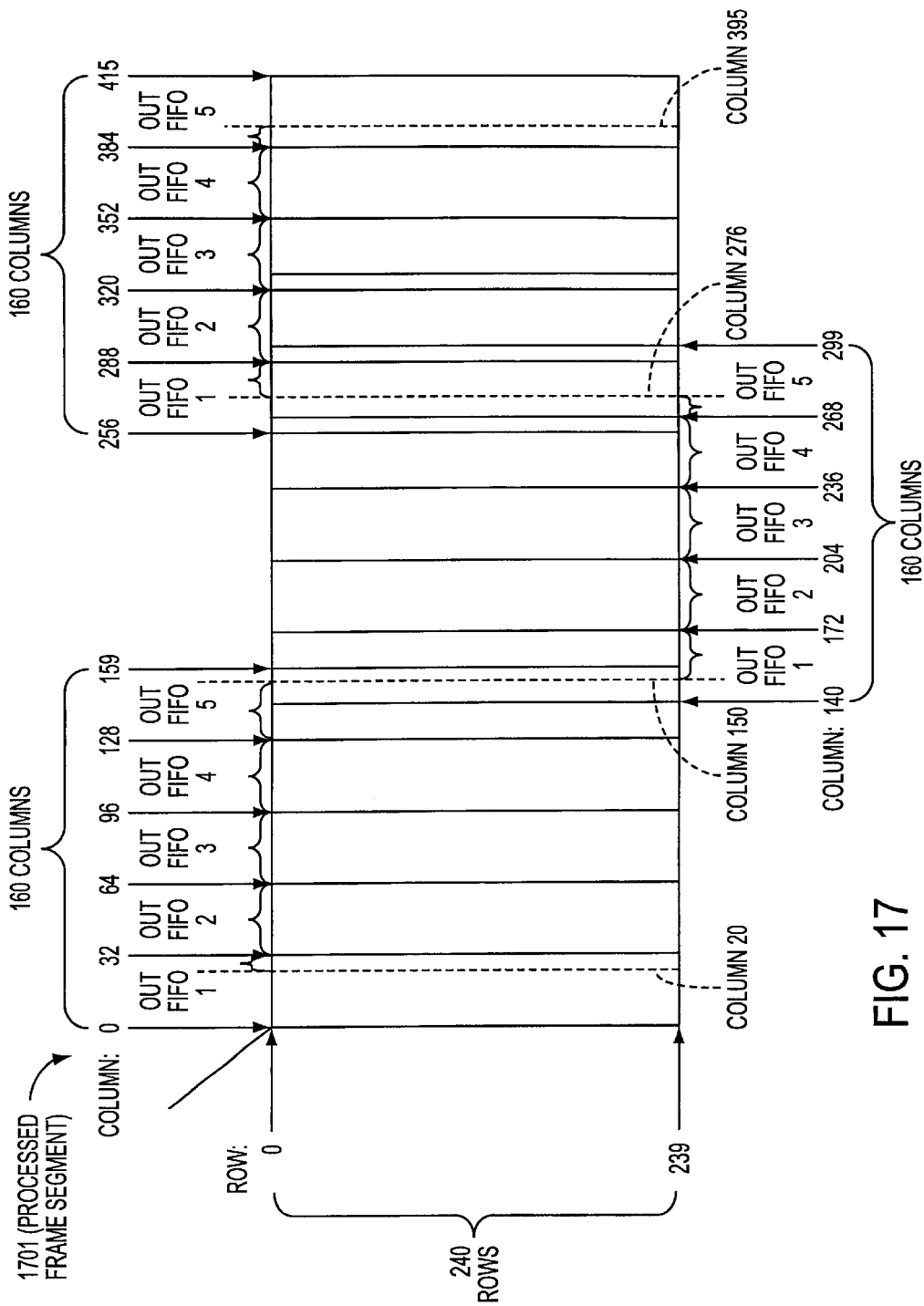
FIG. 17 illustrates how the pixels of an exemplary processed frame segment would be distributed after being moved from the frame buffer to the five channels of the output FIFO, in accordance with an aspect of the invention.

The horizontal construction of a processed frame segment 651 is accomplished during output of the processed frame segment 651 to the I/O board 301. FIG. 17 illustrates how the pixels of an exemplary processed frame segment 1701, comprising the processed shifted subframes 1601' of FIG. 16, would be distributed after being moved from the frame buffer 705 to the five channels of the output FIFO 805. The data of the processed subframe 1701 is stored in the channels of the output FIFO 805 in the same format as in the frame buffer, except that all pixels marked for non-retention are discarded, that is, not written to the corresponding channels of the output FIFO 805.

This is accomplished by the I/O controller 715, which causes each of the channels of the frame buffer 705 to supply a sequentially next pixel at its output port. The I/O controller 715 tests the tag associated with each pixel, and only if that tag indicates that the pixel is to be retained does the I/O controller 715 cause it to be written into the corresponding channel of the output FIFO 805. Otherwise, the pixel is simply discarded.

The example of FIG. 17 is intended to illustrate the case in which a processed frame segment 651 is trimmed at both its left and right sides, presumably because these were horizontally overlapping regions with other frame segments 207 on these sides. Thus, none of the pixels located in columns 0 through 31 or in columns 396 through 415 are moved into any of the channels of the output FIFO 805. Additional trimming has taken place to account for overlapping regions associated with neighboring subframes 901. Thus, in this example, the pixels associated with columns 140 through 149 are moved only into channel 5 of the output FIFO 805, while the pixels associated with columns 150 through 159 are moved only into channel 1 of the output FIFO 805. (Formerly, pixels in this region had been associated with both of these channels.) Similarly, the pixels associated with columns 256 through 275 are moved only into one of channels 4 and 5 of the output FIFO 805, while the pixels associated with columns 276 through 299 are moved only into one of channels 1 and 2 of the output FIFO 805. Vertical trimming is also evident: the output FIFO 805 stores only 240 rows of pixels instead of the 300 that were part of the originally supplied frame segment 207.

The frame segment data is then "collected" from the separate channels of the output FIFO 805 to form a contiguous frame segment as it is written to the master FIFO 807 via an output FIFO data bus 1805. For example, referring to FIG. 17, each frame segment row of processed pixels would be moved from the output FIFO 805 to the master FIFO 807 as follows:

12 pixels of the row (columns 20 through 31) would be moved from channel 1 of the output FIFO 807 to the master FIFO 807;

the next 32 pixels of the row (columns 32–63) would be moved from channel 2 of the output FIFO 807; the next 32 pixels of the row (columns 64–95) would be moved from channel 3 of the output FIFO 807;

the next 32 pixels of the row (columns 96 through 127) would be moved from channel 4 of the output FIFO 807;

the next 22 pixels of the row (columns 128 through 149) would be moved from channel 5 of the output FIFO 807;

the next 22 pixels of the row (columns 150 through. 171) would be moved from channel 1 of the output FIFO 807;

the next 32 pixels of the row (columns 172 through 203) would be moved from channel 2 of the output FIFO 807;

the next 32 pixels of the row (columns 204 through 235) would be moved from channel 3 of the output FIFO 807;

the next 32 pixels of the row (columns 236 through 267) would be moved from channel 4 of the output FIFO 807;

the next 8 pixels of the row (columns 268 through 275) would be moved from channel 5 of the output FIFO 807;

the next 12 pixels of the row (columns 276 through 287) would be moved from channel 1 of the output FIFO 807;

the next 32 pixels of the row (columns 288 through 319) would be moved from channel 2 of the output FIFO 807;

the next 32 pixels of the row (columns 320 through 351) would be moved from channel 3 of the output FIFO 807;

the next 32 pixels of the row (columns 352 through 383) would be moved from channel 4 of the output FIFO 807; and the next 12 pixels of the row (columns 384 through 395) would be moved from channel 5 of the output FIFO 807.

Figure 18:
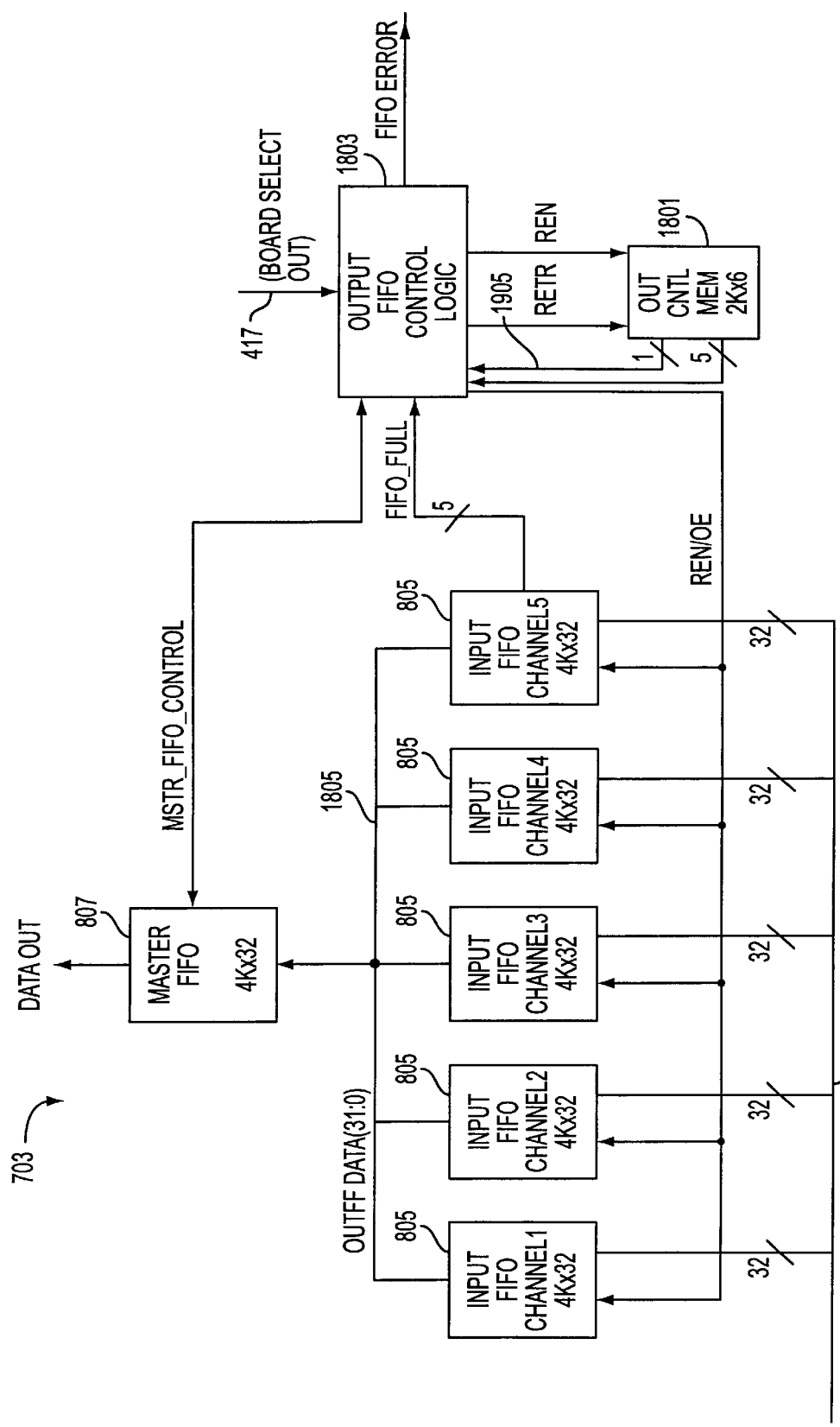
FIG. 18 is a block diagram of an exemplary output buffering stage, in accordance with an aspect of the invention.

In order to control this data movement, the output buffering stage 703 includes the elements depicted in FIG. 18. The output buffering stage 703 provides the appropriate distribution of processed frame segment data from the channels of the output FIFO 803 to the master FIFO 807. An output control memory 1801 is provided for controlling the distribution of the data in a manner similar to that performed by the input control memory 1301. This output control memory 1801 provides a FIFO select word for each pixel that is to be moved. The output control memory 1801 is configured to operate as a rotating buffer, and may be implemented by many different types of memory components, including but not limited to FIFO memory components.

Figure 19:
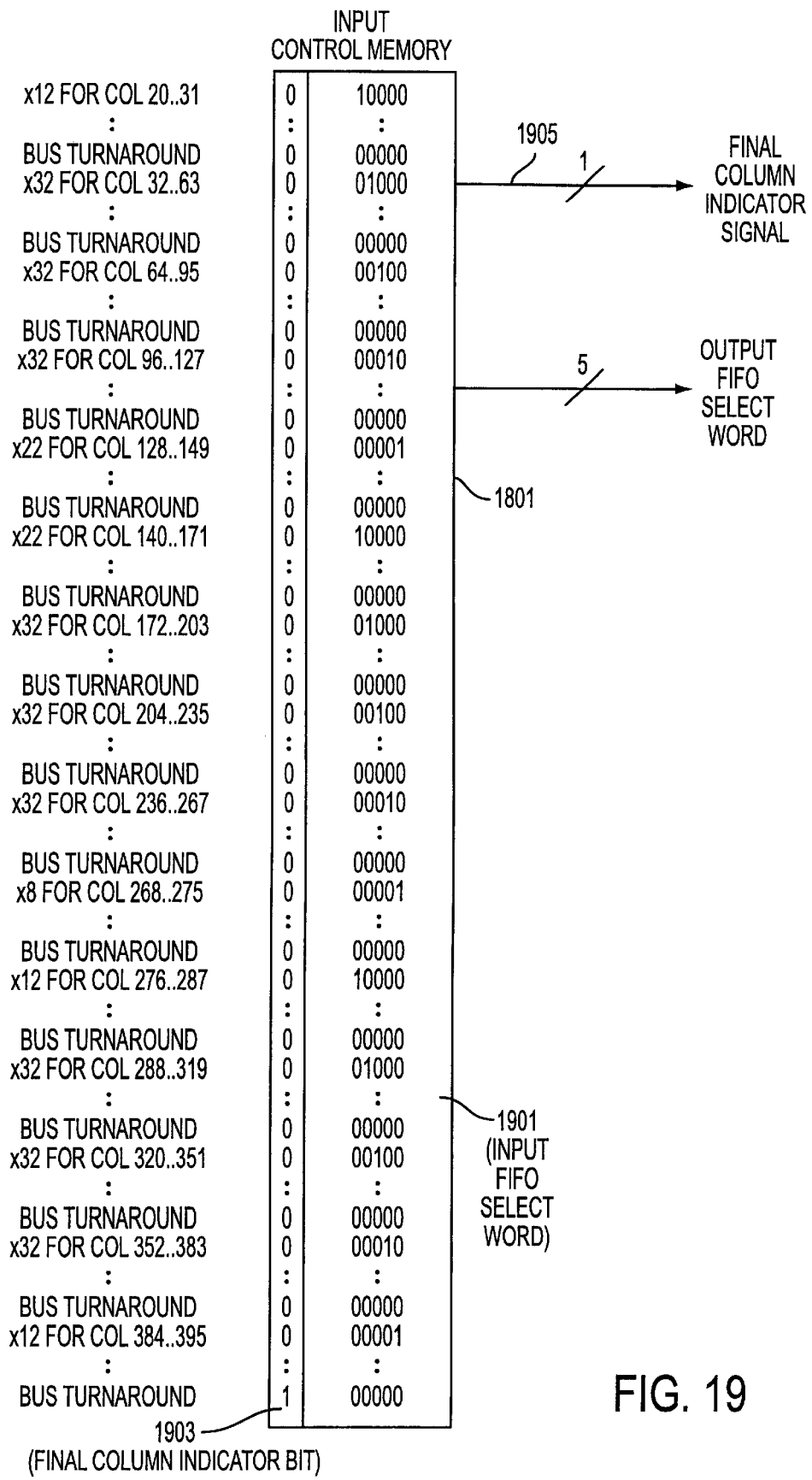
FIG. 19 is a diagram of an exemplary output control memory and exemplary contents, in accordance with an aspect of the invention.

The output control memory 1801 and exemplary contents are shown in greater detail in FIG. 19. The output control memory 1801 stores output FIFO select words 1901, one for each column in the processed frame segment 1701. For each output FIFO select word 1901, the output control memory 1801 also stores a corresponding final column indicator bit 1903, which indicates whether the output FIFO select word 1901 corresponds to the final column in the processed frame segment 1701. Each bit of the output FIFO select word 1901 provides a read enable signal for a corresponding channel of the output FIFO 805. Because only one channel of the output FIFO 805 at a time can drive the output FIFO data bus 1805, each of the output FIFO select words 1901 enables no more than 1 channel of the output FIFO. In some embodiments, it is preferable to insert an output FIFO select word 1901 having a value of all zeros just prior to an output FIFO select word 1901 that will change which of the channels is enabled. This is to provide a "bus turnaround" time period during which none of the channels of the output FIFO 805 are enabled. This permits enough time for one channel of the output FIFO 805 to completely stop driving the output FIFO data bus 1805 before the next channel begins, thereby preventing any possibility of the two channels attempting to drive the output FIFO data bus 1805 at the same time. Upon completing the transference of each frame segment row from the output FIFO 805 to the master FIFO 807, the final column indicator signal 1905, which is supplied at the output of the output control memory 1801, is asserted. The final column indicator signal 1905 is supplied to output FIFO control logic 1803, which responds by causing the output control memory 1801 to again begin retrieving values from the initial starting point, so that the output FIFO 805 can supply pixels associated with a next row in the processed frame segment 1701. Data is read from the master FIFO 807 upon assertion of the board select out signal 417 supplied by the I/O board 301. In this manner, processed frame segment data is moved from the processor board 303 to the I/O board 301.

It is reiterated that the frame segment data in the master FIFO 807 represents the processed frame segment 1701 that has been reconstructed from the processed subframes 1601. This processed frame segment 1701 in turn is ready for reconstruction with other processor board frame segments into a processed image frame 650. As explained earlier, the output collector 413 on the I/O board 301 controls this function by selectively enabling the data output from particular ones of the processor boards 303 in an order that builds a processed image frame 650 one row at a time.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, the descriptions of the exemplary embodiments presented herein make numerous references to the distribution and collection of pixels and other image-related (e.g., sensor-derived) data items. However, this is not an essential feature of the invention. Rather, the various techniques described above can easily, and without any need for modification, be applied to the distribution and collection of any type of data item. Thus, the term "data item" is used herein to refer to all types of data, including but not limited to pixels and other imagerelated data.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of selectively distributing a plurality of data items to a plurality of hardware destinations that share a common bus, the method comprising:

for each one of the data items, performing a distribution procedure comprising:
determining which of the hardware destinations the data item should be distributed to, wherein at least one of the data items should be distributed to two or more hardware destinations;
supplying the data item to the common bus; and
for each of the hardware destinations to which the data item should be distributed, generating a corresponding hardware destination signal that causes the data item to be received in the hardware destination from the common bus, wherein for each data item, the corresponding hardware destination signals are generated substantially simultaneously, wherein each of the hardware destinations is one of a plurality of input memory devices that are commonly installed on a processor board, and wherein:
the plurality of data items form a frame segment that is partitioned into a plurality of overlapping subframes;
each of the data items that should be distributed to two or more hardware destinations is associated with an overlap region formed by at least two of the overlapping subframes;
each of the input memory devices is associated with a corresponding one of a plurality of channels on the processor board; and
each of the channels is associated with a corresponding one of a plurality of addressable storage devices, and further comprising:
for each of the channels, loading data items into the corresponding addressable storage device from the corresponding input memory device.

2. The method of claim 1, wherein the step of, for each of the channels, loading data items into the corresponding addressable storage device from the corresponding input memory device, is performed such that, for each of the channels, each data item that is associated with an overlap region associated with vertically overlapping subframes is stored at only one location within the corresponding one of the plurality of addressable storage devices.

3. The method of claim 2, wherein each of the channels is associated with a corresponding one of a plurality of processing element arrays, and further comprising:

for each of the channels, loading data items into the corresponding one of the processing element arrays from the corresponding addressable storage device;

in each of the processing element arrays, forming a processed subframe; and in each of the processing element arrays, aligning the processed subframe so that at least one edge row of processing elements in the processing element array includes a selected row of processed data items, wherein the selected row of processed data items includes at least one processed data item that will be supplied as an output data item from the processor board.

4. The method of claim 1, wherein each of the channels is associated with a corresponding one of a plurality of processing element arrays, and further comprising:

for each of the channels, loading data items into the corresponding one of the processing element arrays from the corresponding addressable storage device; and in each of the processing element arrays, forming a processed subframe in which each processed data item is marked to indicate whether the processed data item is to be retained or discarded.

5. The method of claim 4 further comprising:

for each of the channels, loading the processed subframe from the corresponding processing element array into the corresponding addressable storage device.

6. The method of claim 5, wherein each of the channels is associated with a corresponding one of a plurality of output storage devices; and further comprising:

for each of the channels, conditionally loading a data item from the corresponding addressable storage device into the corresponding output storage device only if the data item is marked for retention.

7. An apparatus that selectively distributes a plurality of data items to a plurality of hardware destinations that share a common bus, the apparatus comprising:

determining logic that determines which one or more of the hardware destinations a next one of the data items should be distributed to;

logic that supplies the next one of the data items to the common bus; and logic that substantially simultaneously generates a hardware destination signal for each of the hardware destinations to which the next one of the data items should be distributed, wherein each hardware destination signal causes the next one of the data items to be received in the corresponding hardware destination from the common bus, wherein when the determining logic determines that the next one of the data items is to be distributed to two or more of the hardware destinations, a corresponding two or more of the hardware destination signals are substantially simultaneously generated, wherein each of the hardware destinations is one of a plurality of input memory devices that are commonly installed on a processor board, and wherein:

the plurality of data items form a frame segment that is partitioned into a plurality of overlapping subframes;

each of the data items that is associated with an overlap region formed by at least two of the overlapping subframes is a data item that should be distributed to two or more hardware destinations;

each of the input memory devices is associated with a corresponding one of a plurality of channels on the processor board; and each of the channels is associated with a corresponding one of a plurality of addressable storage devices, and further comprising:

logic that loads data items into the corresponding addressable storage device from the corresponding input memory device for each of the channels.

8. The apparatus of claim 7, wherein the logic that loads data items into the corresponding addressable storage device from the corresponding input memory device for each of the channels operates such that, for each of the channels, each data item that is associated with an overlap region associated with vertically overlapping subframes is stored at only one location within the corresponding one of the plurality of addressable storage devices.

9. The apparatus of claim 8, wherein each of the channels is associated with a corresponding one of a plurality of processing element arrays, and further comprising:

the plurality of processing element arrays;

logic that loads data items into the corresponding one of the processing element arrays from the corresponding addressable storage device for each of the channels;

in each of the processing element arrays, logic that forms a processed subframe; and in each of the processing element arrays, logic that aligns the processed subframe so that at least one edge row of processing elements in the processing element array includes a selected row of processed data items, wherein the selected row of processed data items includes at least one processed data item that will be supplied as an output data item from the processor board.

10. The apparatus of claim 7, wherein each of the channels is associated with a corresponding one of a plurality of processing element arrays, and further comprising:

the plurality of processing element arrays;

logic that loads data items into the corresponding one of the processing element arrays from the corresponding addressable storage device for each of the channels; and in each of the processing element arrays, logic that forms a processed subframe in which each processed data item is marked to indicate whether the processed data item is to be retained or discarded.

11. The apparatus of claim 10, further comprising:

logic that loads the processed subframe from the corresponding processing element array into the corresponding addressable storage device for each of the channels.

12. The apparatus of claim 11, wherein each of the channels is associated with a corresponding one of a plurality of output storage devices; and further comprising:

the plurality of output storage devices;

for each of the channels, logic that conditionally loads a data item from the corresponding addressable storage device into the corresponding output storage device only if the data item is marked for retention.

* * * * *